US012797851B2

(12) United States Patent
Tashiro et al.

(10) Patent No.: US 12,797,851 B2
(45) Date of Patent: Nov. 17, 2026

(54) BIOLOGICAL PARTICLE SORTING DEVICE AND METHOD FOR ADJUSTING SORTING CONDITION IN BIOLOGICAL PARTICLE SORTING DEVICE

(71) Applicant: Sony Group Corporation, Tokyo (JP)

(72) Inventors: Shinji Tashiro, Tokyo (JP); Kazuya Takahashi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 493 days.

(21) Appl. No.: 18/282,093

(22) PCT Filed: Feb. 14, 2022

(86) PCT No.: PCT/JP2022/005606
§ 371 (c)(1),
(2) Date: Sep. 14, 2023

(87) PCT Pub. No.: WO2022/201959
PCT Pub. Date: Sep. 29, 2022

(65) Prior Publication Data
US 2024/0165621 A1 May 23, 2024

(30) Foreign Application Priority Data
Mar. 26, 2021 (JP) ................................ 2021-052998

(51) Int. Cl.
*B01L 3/00* (2006.01)
*G01N 15/02* (2024.01)

(52) U.S. Cl.
CPC ........ *B01L 3/502761* (2013.01); *G01N 15/02* (2013.01); *B01L 2200/0652* (2013.01);
(Continued)

(58) Field of Classification Search
CPC ....... B01L 3/502761; B01L 2200/0652; B01L 2200/143; B01L 2300/0816;
(Continued)

(56) References Cited

U.S. PATENT DOCUMENTS

2015/0204774 A1 7/2015 Ito
2020/0072732 A1 3/2020 Hashimoto et al.

FOREIGN PATENT DOCUMENTS

EP 2876427 A 5/2015
JP 2012-127922 A 7/2012
(Continued)

OTHER PUBLICATIONS

International Written Opinion and English translation thereof mailed May 10, 2022 in connection with International Application No. PCT/JP2022/005606.
(Continued)

*Primary Examiner* — Brian J. Sines
(74) *Attorney, Agent, or Firm* — Wolf, Greenfield & Sacks, P.C.

(57) ABSTRACT

Provided is a technique for preventing the occurrence of cavitation in a biological particle sorting operation.
The present disclosure provides a biological particle sorting device including: a pressure changing element that changes a pressure in a channel in which a biological particles determined to be sorted is recovered; and a control unit that drives the pressure changing element, the control unit adjusting a drive waveform of the pressure changing element on the basis of information associated with the number of times of sorting processing per unit time or information associated with a percentage or the number of sorting target particles contained in a unit sample. Furthermore, the present disclosure also provides a method for adjusting a sorting condition in a biological particle sorting device.

21 Claims, 12 Drawing Sheets

(52) U.S. Cl.
CPC .............................. *B01L 2200/143* (2013.01); *G01N 2015/0288* (2013.01)

(58) Field of Classification Search
CPC ..... B01L 2300/0864; B01L 2400/0481; G01N 15/02; G01N 2015/0288; G01N 15/1425; G01N 15/1459; G01N 15/1484; G01N 15/149
See application file for complete search history.

(56) References Cited

FOREIGN PATENT DOCUMENTS

| | | | |
|---|---|---|---|
| JP | 2014-202573 | A | 10/2014 |
| JP | 2020-076736 | A | 5/2020 |
| WO | 2014/013802 | A1 | 1/2014 |
| WO | 2018/216269 | A1 | 11/2018 |
| WO | WO-2019187466 | A1 | 10/2019 |
| WO | 2020/054735 | A1 | 3/2020 |

OTHER PUBLICATIONS

International Preliminary Report on Patentability and English translation thereof mailed Oct. 5, 2023 in connection with International Application No. PCT/JP2022/005606.
Extended European Search Report for European Application No. 22774760.7 dated Jul. 22, 2024.
International Search Report and English translation thereof mailed May 10, 2022 in connection with International Application No. PCT/JP2022/005606.

A

B

BIOLOGICAL PARTICLE SORTING DEVICE AND METHOD FOR ADJUSTING SORTING CONDITION IN BIOLOGICAL PARTICLE SORTING DEVICE

CROSS-REFERENCE TO RELATED APPLICATIONS

This application claims the benefit under 35 U.S.C. § 371 as a U.S. National Stage Entry of International Application No. PCT/JP2022/005606, filed in the Japanese Patent Office as a Receiving Office on Feb. 14, 2022, which claims priority to Japanese Patent Application Number 2021-052998, filed in the Japanese Patent Office on Mar. 26, 2021, each of which is hereby incorporated by reference in its entirety.

TECHNICAL FIELD

The present disclosure relates to a biological particle sorting device and a method for adjusting a sorting condition in a biological particle sorting device.

BACKGROUND ART

Various biological particle sorting devices have been developed so far to sort biological particles. For example, in a particle sorting system used in a flow cytometer, a laminar flow including a sample liquid containing cells and a sheath liquid is discharged from an orifice formed on a flow cell or a microchip. When being discharged, predetermined vibration is applied to the laminar flow to form a droplet. A moving direction of the formed droplets is electrically controlled depending on whether or not intended particles are contained, and the intended particles can be sorted.

A technology for sorting intended particles in a microchip without forming droplets as described above has also been developed. For example, Patent Document 1 below describes "a microchip comprising: a sample liquid feed channel for permitting a sample liquid containing a particulate to flow through; at least one pair of sheath liquid feed channels configured to merge to the sample liquid feed channel from both sides thereof for permitting a sheath liquid to flow through surrounding the sample liquid; a merging channel connected to the sample liquid feed channel and the at least one pair of the sheath liquid feed channels, for permitting the sample liquid and the sheath liquid to merge and flow through the merging channel; a vacuum suction unit connected to the merging channel, for absorbing and drawing into the particulate subject to collection; and at least one pair of discharge channels formed on both sides of the vacuum suction unit for permitting to flow through from the merging channel" (claim 1). In the microchip, the intended particles are drawn and collected into the vacuum suction unit.

CITATION LIST

Patent Document

Patent Document 1: Japanese Patent Application Laid-Open No. 2012-127922

SUMMARY OF THE INVENTION

Problems to be Solved by the Invention

In a biological particle sorting device, it is desirable that the sorting efficiency is as high as possible. In order to enhance the sorting efficiency, for example, it is conceivable to shorten a drive time of an element that generates a negative pressure in the vacuum suction unit in a sorting operation using the microchip described in Patent Document 1. Therefore, even when a sorting target particle and a non-sorting target particle are close to each other, only the former can be sorted.

However, it has been found that the possibility that cavitation occurs in a channel accompanying the generation of the negative pressure increases as the drive time becomes shorter. The occurrence of cavitation may cause a decrease in sorting accuracy or may affect biological particles. Furthermore, minute bubbles generated by the cavitation may be detected as pseudo particles, which may also cause a decrease in measurement accuracy such as a sorting collection rate. Furthermore, the bubbles generated by the cavitation may also cause corrosion of the biological particle sorting device. Therefore, it is desirable to prevent the occurrence of cavitation.

Solutions to Problems

Therefore, the present inventors have found that the occurrence of cavitation can be prevented by adjusting a drive waveform of an element on the basis of specific information.

That is, the present disclosure provides a biological particle sorting device including:

- a pressure changing element that changes a pressure in a channel in which a biological particle determined to be sorted is recovered; and
- a control unit that drives the pressure changing element,
- the control unit adjusting a drive waveform of the pressure changing element on the basis of
- information associated with the number of times of sorting processing per unit time or
- information associated with a percentage or the number of sorting target particles contained in a unit sample.

The control unit may adjust a drive time, a drive voltage, or both the drive time and the drive voltage among elements of the drive waveform.

In a case where the number of times of sorting processing is equal to or more than a predetermined value, the control unit may increase the drive time, lower the drive voltage, or execute both of them.

The number of times of sorting processing may be a counted number of times of sorting processing or an estimated number of times of sorting processing.

The number of times of sorting processing may be the number of times the pressure changing element is driven per unit time.

The number of times of sorting processing may be the number of times a determination is made to execute sorting per unit time.

The biological particle sorting device further includes a determination unit that determines whether or not to sort a biological particle, and

- the control unit may adjust the drive waveform on the basis of information associated with the number of times a determination is made to execute sorting by the determination unit.

In a case where the percentage or the number of the sorting target particles is equal to or more than a predetermined value, the control unit may increase the drive time, lower the drive voltage, or execute both of them.

The information associated with the percentage or the number of the sorting target particles may be information acquired as a result of a sorting operation executed by the biological particle sorting device or information input to the biological particle sorting device.

The control unit may adjust one or more of a step-up time, a step-down time, and a holding time among elements of the drive waveform.

In adjusting the drive waveform, the control unit may select a drive waveform to be applied from among a plurality of types of drive waveforms set in advance on the basis of either the information associated with the number of times of sorting processing or the information associated with the percentage or the number of the sorting target particles.

The control unit may adjust the drive waveform in a sorting condition parameter adjustment step before performing a biological sample sorting processing step or in the biological sample sorting processing step.

The control unit may adjust a drive time on the basis of the information associated with the number of times of sorting processing per unit time or the information associated with the percentage or the number of the sorting target particles contained in the unit sample, and a drive voltage set to be applied to the sorting processing.

The control unit is configured to adjust the drive waveform in a sorting condition parameter adjustment step before performing a biological sample sorting processing step, and the control unit may adjust the drive time in the sorting condition parameter adjustment step.

In a case where the biological particle sorting device executes one sorting operation of sorting a plurality of types of sorting target particles at a predetermined ratio, the control unit may adjust the drive waveform in the middle of the sorting operation.

The control unit may adjust the drive waveform in response to a change of a sorting target particle in the middle of the sorting operation.

The biological particle sorting device may be configured to execute a parameter adjustment step of adjusting a sorting condition parameter to be used in a biological sample sorting processing step.

The biological particle sorting device may be configured to execute a delay time adjustment process in the parameter adjustment step.

The biological particle sorting device may be configured to measure a collection rate represented by the number of sorted particles with respect to the number of sorting operations in the delay time adjustment process.

In measuring the collection rate, only in a case where no other biological particle is present within a predetermined range around a biological particle determined to be sorted, a sorting operation is executed for the biological particle.

Furthermore, the present disclosure provides a method for adjusting a sorting condition in a biological particle sorting device, the method including a drive waveform adjustment step of adjusting a drive waveform of a pressure changing element that changes a pressure in a channel in which a biological particle determined to be sorted is recovered.

In the drive waveform adjustment step, the drive waveform of the pressure changing element is adjusted on the basis of information associated with the number of times of sorting processing per unit time or information associated with a percentage or the number of sorting target particles contained in a unit sample.

MODE FOR CARRYING OUT THE INVENTION

Figure 1:
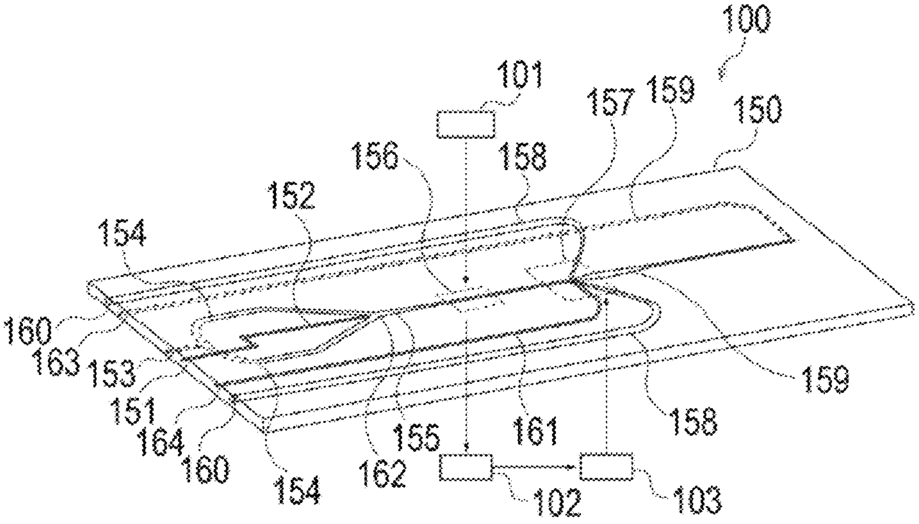
FIG. 1 is a diagram illustrating a configuration example of a biological particle sorting device according to the present disclosure and a biological particle sorting microchip included in the device.

Hereinafter, preferred modes for carrying out the present disclosure will be described. Note that embodiments described below illustrate representative embodiments of the present disclosure, and the scope of the present disclosure is not limited only to these embodiments. Note that the present disclosure will be described in the following order.

1. First embodiment (biological particle sorting device)
(1) Description of first embodiment
(2) Example of biological particle sorting device
(2-1) Configuration of device and sorting operation
(2-2) Flow step (2-3) Determination step
(2-4) Recovery step
(2-5) Biological particle sorting microchip and biological particle
(3) Drive waveform adjustment
(3-1) Description regarding occurrence of cavitation and drive waveform adjustment for preventing the occurrence of cavitation
(3-1-1) Occurrence of cavitation accompanying improvement in sorting efficiency
(3-1-2) Utility of drive waveform adjustment in setting of sorting condition parameter
(3-1-3) Relationship between number of times of driving and occurrence of cavitation
(3-1-4) Relationship between drive time and suction amount with respect to particle sorting channel
(3-1-5) Basic concept of present disclosure
(3-2) Drive waveform adjustment based on information associated with number of times of sorting processing
(3-3) Drive waveform adjustment based on information associated with percentage or number of sorting target particles
(3-4) Timing of drive waveform adjustment
(3-4-1) Drive waveform adjustment in sorting condition parameter adjustment step
(3-4-2) Drive waveform adjustment in sorting processing step
(3-5) Delay time setting process
(3-6) Real-time drive waveform adjustment
(3-7) Drive waveform adjustment for sorting multiple types of sorting target particles
(3-8) Drive waveform adjustment according to device or environment
(3-9) Drive waveform adjustment according to purity
(3-10) Drive waveform adjustment based on information associated with occurrence of cavitation
2. Second embodiment (method for adjusting sorting condition in biological particle sorting device)

1. First Embodiment (Biological Particle Sorting Device)

(1) Description of First Embodiment

A biological particle sorting device according to the present disclosure includes: a pressure changing element that changes a pressure in a channel in which a biological particle determined to be sorted is recovered; and a control unit that drives the pressure changing element. The control unit is configured to adjust a drive waveform of the pressure changing element on the basis of information associated with the number of times of sorting processing per unit time or information associated with a percentage or the number of sorting target particles contained in a unit sample.

In order to maximize the sorting efficiency while suppressing the occurrence of cavitation, it is useful to adjust the drive waveform of the pressure changing element on the basis of these pieces of information. In this regard, an example of a biological particle sorting device to which the present disclosure is applied will be described in the following (2), and the adjustment will be described in the following (3).

(2) Example of Biological Particle Sorting Device

(2-1) Configuration of Device and Sorting Operation

Figure 2:
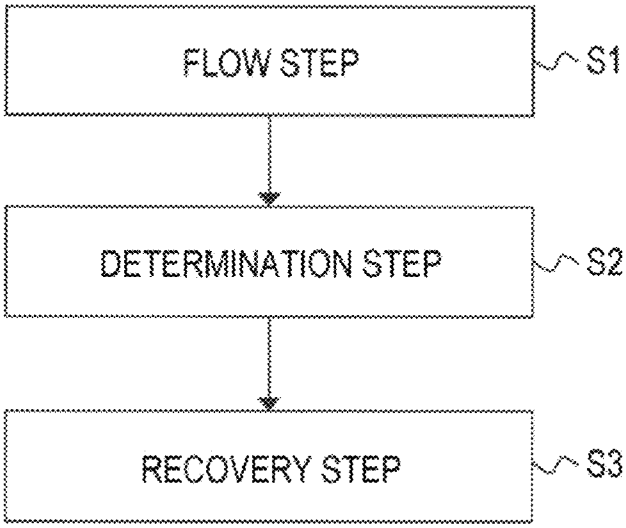
FIG. 2 is a view illustrating an example of a flow of biological particle sorting processing executed using the biological particle sorting device according to the present disclosure.

A biological particle sorting device according to the present disclosure may be configured as a device that sorts biological particles in a closed space, and may be configured as a device that sorts biological particles by controlling a channel through which the biological particles travel, for example. FIG. 1 illustrates a configuration example of the biological particle sorting device according to the present disclosure. The drawing also illustrates an example of a channel structure of a biological particle sorting microchip (hereinafter also referred to as a "microchip") attached to the device. FIG. 2 illustrates an example of a flowchart of sorting processing executed by the biological particle sorting device.

Figure 4:
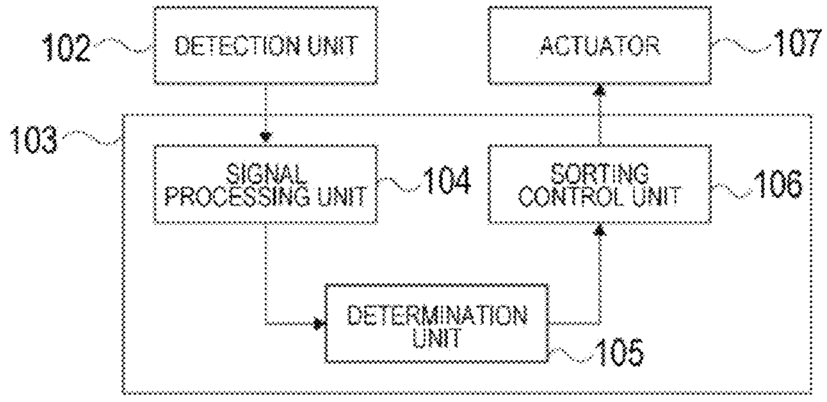
FIG. 4 is a block diagram of an example of a control unit.

A biological particle sorting device 100 illustrated in FIG. 1 includes a light irradiation unit 101, a detection unit 102, and a control unit 103. The biological particle sorting device 100 further includes a microchip 150. The microchip 150 may be attached to the biological particle sorting device 150 in an exchangeable manner. As illustrated in FIG. 4, the control unit 103 may include a signal processing unit 104, a determination unit 105, and a sorting control unit 106.

Hereinafter, first, the biological particle sorting microchip 150 will be described, and next, other components of the biological particle sorting device 100 will be described while describing a sorting operation by the biological particle sorting device.

The biological particle sorting microchip 150 illustrated in FIG. 1 includes a sample liquid channel 152 and a sheath liquid channel 154 that joins the sample liquid channel 152 at a junction 162. The biological particle sorting microchip 150 is further provided with a sample liquid inlet 151 and a sheath liquid inlet 153.

Note that, in FIG. 1, a part of the sheath liquid channel 154 is indicated by a dotted line. The part indicated by the dotted line is located in a position lower than that of the sample liquid channel 152 indicated by a solid line (position displaced in an optical axis direction to be described later as indicated by an arrow extending from reference sign 101 to reference sign 102), and the channels do not communicate with each other in a position in which the channel indicated by the dotted line intersects with the channel indicated by the solid line. Furthermore, in FIG. 1, the sample liquid channel 152 is illustrated to bend twice between the sample liquid inlet 151 and the junction 162, which makes it easy to distinguish between the sample liquid channel 152 and the sheath liquid channel 154. The sample liquid channel 152 may be formed linearly without bending in this manner between the sample liquid inlet 151 and the junction 162.

In the biological particle sorting operation, a sample liquid containing biological particles is introduced from the sample liquid inlet 151 into the sample liquid channel 152, and a sheath liquid not including the biological particles is introduced from the sheath liquid inlet 153 into the sheath liquid channel 154.

The biological particle sorting microchip 150 includes a joined channel 155 including the junction 162 on one end thereof. The joined channel 155 includes a sorting discrimination unit 156 used for performing sorting discrimination of the biological particles.

The sample liquid and the sheath liquid join at the junction 162, then flow in the joined channel 155 toward a particle sorting unit 157. Especially, the sample liquid and the sheath liquid join at the junction 162 to form, for example, a laminar flow in which the sample liquid is surrounded by the sheath liquid. Preferably, in the laminar flow, the biological particles are arrayed substantially in a line. Due to the channel structure in which the sample liquid channel 152 and two sheath liquid channels 154 join at the junction 162, the channel structure including the joined channel 155 one end of which is the junction 162, the laminar flow including the biological particles that flow substantially in a line is formed. Therefore, in light irradiation in the sorting discrimination unit (also referred to as a detection region) 156 to be described below, it becomes easy to distinguish light generated when irradiating one biological particle with light from light generated when irradiating other biological particles with light.

Figure 3:
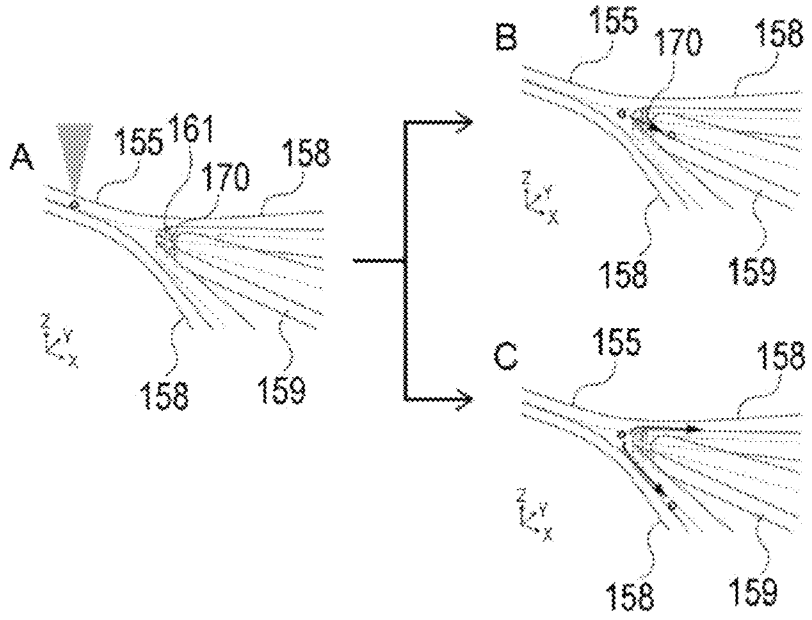
FIG. 3 is an enlarged view of an example of a particle sorting unit of the biological particle sorting microchip used in the present disclosure.

The biological particle sorting microchip 150 further includes the particle sorting unit 157 at the other end of the joined channel 155. FIG. 3 is an enlarged view of the particle sorting unit 157. As illustrated in FIG. 3A, at the other end, the joined channel 155 is connected to a biological particle recovery channel 159 via a connection channel 170. As illustrated in FIG. 3A, the joined channel 155, the connection channel 170, and the biological particle recovery channel 159 may be coaxial with each other.

In a case where a recovery target particle (also referred to as a "sorting target particle" in the present specification) flows to the particle sorting unit 157, as illustrated in FIG. 3B, a flow from the joined channel 155 through the connection channel 170 to enter the biological particle recovery channel 159 is formed, and the recovery target particle is recovered into the biological particle recovery channel 159. In this manner, the recovery target particle flows through the connection channel 170 to the biological particle recovery channel 159.

In a case where the biological particle that is not the recovery target particle flows to the particle sorting unit 157, the biological particle that is not the recovery target particle flows to a branching channel 158 as illustrated in FIG. 3C. In this case, the flow entering the biological particle recovery channel 159 is not formed.

As illustrated in FIG. 1, the biological particle recovery channel 159 is formed so as to extend linearly from the particle sorting unit 157, make a U-turn, then reach the same surface as a surface on which the sample liquid inlet 151 and the sheath liquid inlet 153 are formed. The liquid that flows through the biological particle recovery channel 159 is discharged out of the chip from a recovery channel terminal 163.

As illustrated in FIG. 1, the two branching channels 158 are also formed so as to extend linearly from the particle sorting unit 157, make a U-turn, and then reach the same surface as the surface on which the sample liquid inlet 151 and the sheath liquid inlet 153 are formed. The liquid that flows through the branching channel 158 is discharged out of the chip from a branching channel terminal 160.

In FIG. 1, a display method of the biological particle recovery channel 159 is changed from a solid line to a dotted line at the U-turn. This change indicates that the position in the optical axis direction changes on the way. Since the position is changed in the optical axis direction in this manner, the biological particle recovery channel 159 does not communicate with the branching channel 158 in a portion intersecting with the branching channel 158.

The recovery channel terminal 163 and two branching channel terminals 166 are all formed on the surface on which the sample liquid inlet 151 and the sheath liquid inlet 153 are formed. Moreover, an introduction channel inlet 164 for introducing a liquid into an introduction channel 161 as described later is also formed on the surface. In this manner, in the biological particle sorting microchip 150, all of the inlets from which the liquid is introduced and outlets from which the liquid is discharged are formed on one surface. Therefore, attachment of the chip to the biological particle sorting device 100 becomes easy. For example, as compared with a case where the inlets and/or outlets are formed on two or more surfaces, connection between channels provided on the biological particle sorting device 100 and the channels of the biological particle sorting microchip 150 becomes easy.

As illustrated in FIGS. 1 and 3, the biological particle sorting microchip 150 includes the introduction channel 161 for introducing the liquid into the connection channel 170.

As the liquid is introduced from the introduction channel 161 into the connection channel 170, the connection channel 170 is filled with the liquid. Therefore, it is possible to prevent an unintended biological particle from entering the biological particle recovery channel 159.

The biological particle sorting microchip 150 includes two branching channels 158 connected to the joined channel 155 at the other end of the joined channel 155. In this manner, in the biological particle sorting microchip used in the present disclosure, the joined channel may be branched into the connection channel and the at least one branching channel.

The biological particle other than the recovery target particle flows to either of the two branching channels 158 without entering the biological particle recovery channel 159.

As illustrated in FIG. 2, the biological particle sorting operation using the biological particle sorting microchip 150 includes a flow step S1 of allowing the liquid containing the biological particles to flow through the joined channel 155, a determination step S2 of determining whether or not the biological particle that flows through the joined channel 155 is the recovery target particle, and a recovery step S3 of recovering the recovery target particle into the biological particle recovery channel 159.

Each step is described below.

(2-2) Flow Step

At the flow step S1, the sample liquid containing the biological particles and the sheath liquid not including the biological particles are introduced from the sample liquid inlet 151 and the sheath liquid inlet 153 into the sample liquid channel 152 and the sheath liquid channel 154, respectively. The sample liquid may be, for example, a biological sample containing biological particles, and especially may be a biological sample containing biological particles such as cells.

The sample liquid and the sheath liquid join at the junction 162 to form, for example, the laminar flow in which the sample liquid is surrounded by the sheath liquid. Preferably, in the laminar flow, the biological particles are arrayed substantially in a line. That is, at the flow step S1, the laminar flow including the biological particles that flow substantially in a line may be formed.

In this manner, at the flow step S1, the liquid containing the biological particles is allowed to flow in the joined channel 155, especially as the laminar flow.

The liquid flows in the joined channel 155 from the junction 162 toward the particle sorting unit 157.

(2-3) Determination Step

At the determination step S2, it is determined whether or not the biological particle that flows through the joined channel 155 is the recovery target particle. The determination may be made by the determination unit 105. The determination unit 105 may make the determination on the basis of the light generated by the irradiation of the biological particle with light by the light irradiation unit 101. An example of the determination step S2 is described below in further detail.

At the determination step S2, the light irradiation unit 101 irradiates the biological particle that flows through the joined channel 155 (especially, the sorting discrimination unit 156) in the biological particle sorting microchip 150, for example, with light (for example, excitation light), and the detection unit 102 detects the light generated by the light irradiation. On the basis of a feature of the light detected by the detection unit 102, the determination unit 105 determines whether or not the biological particle is the recovery target particle. For example, the determination unit 105 may make a determination based on scattered light, a determination based on fluorescence, or a determination based on an image (for example, a dark field image or/and a bright field image). At the recovery step S3 described later, the control unit 103 controls the flow in the biological particle sorting microchip 150, so that the recovery target particle is recovered into the biological particle recovery channel 159.

The light irradiation unit 101 irradiates the biological particle that flows in the channel in the biological particle sorting microchip 150 with light (for example, excitation light). The light irradiation unit 101 may include a light source that emits light, and an objective lens that condenses the excitation light on the biological particle that flows through the sorting discrimination unit. The light source may be appropriately selected by one skilled in the art depending on a purpose of an analysis, and may be, for example, a laser diode, an SHG laser, a solid-state laser, a gas laser, a high brightness LED, or a halogen lamp, or may be a combination of two or more of them. The light irradiation unit may include other optical elements as needed in addition to the light source and the objective lens.

In one embodiment of the present disclosure, the detection unit 102 detects scattered light and/or fluorescence generated from the biological particle by the light irradiation by the light irradiation unit 101. The detection unit 102 may include a condensing lens that condenses the fluorescence and/or scattered light generated from the biological particle and a detector. As the detector, a PMT, a photodiode, a CCD, a CMOS and the like may be used, but this is not limited thereto. The detection unit 102 may include other optical elements as needed in addition to the condensing lens and the detector. The detection unit 102 may further include, for example, a spectroscopic unit. Examples of optical components that form the spectroscopic unit may include a grating, a prism, and an optical filter, for example. The spectroscopic unit may detect, for example, light having a wavelength that should be detected separately from light having another wavelength. The detection unit 102 may convert the detected light into an analog electric signal by photoelectric conversion. The detection unit 102 may further convert the analog electric signal into a digital electric signal by AD conversion.

In another embodiment of the present disclosure, the detection unit 102 may obtain an image generated by the light irradiation by the light irradiation unit 101. The image may be, for example, a dark field image, a bright field image, or both of them. In this embodiment, the light irradiation unit 101 includes, for example, a halogen lamp or a laser, and the detection unit 102 may include a CCD or a CMOS. The detection unit 102 may be, for example, an imaging element obtained by stacking a substrate incorporating a CMOS sensor and a substrate incorporating a digital signal processor (DSP). As the DSP of the imaging element is made to operate as a machine learning unit, the imaging element may operate as a so-called AI sensor. The detection unit 102 including the imaging element may determine whether or not the biological particle is the recovery target particle, for example, on the basis of a learning model. Furthermore, the learning model may be updated in real time while the method according to the present disclosure is performed. For example, the DSP may perform machine learning processing during reset of a pixel array unit in the CMOS sensor, exposure of the pixel array unit, or readout of a pixel signal from each unit pixel of the pixel array unit. As an example of the imaging element that operates as the AI sensor, there may be, for example, an imaging device disclosed in International Publication No. 2018/051809.

The signal processing unit 104 included in the control unit 103 may process a waveform of the digital electric signal obtained by the detection unit 102 to generate information (data) regarding a feature of the light used for the determination by the determination unit 105. As the information associated with the feature of the light, the signal processing unit 104 may acquire, for example, one, two, or three of a width of the waveform, a height of the waveform, and an area of the waveform from the waveform of the digital electric signal. Furthermore, the information associated with the feature of the light may include, for example, time when the light is detected. The above-described processing by the signal processing unit 104 may be performed especially in the embodiment in which the scattered light and/or fluorescence is detected.

On the basis of the light generated by irradiating the biological particle that flows in the channel with light, the determination unit 105 included in the control unit 103 determines whether or not the biological particle is the recovery target particle.

In the embodiment in which the scattered light and/or fluorescence is detected, the waveform of the digital electric signal acquired by the detection unit 102 is processed by the control unit 103, and then, on the basis of the information associated with the feature of the light generated by the processing, the determination unit 105 determines whether or not the biological particle is the recovery target particle. For example, in the determination based on the scattered light, a feature of an outer shape and/or an internal structure of the biological particle may be specified, and it may be determined whether or not the biological particle is the recovery target particle on the basis of the feature. Moreover, for example, by performing pretreatment on the biological particle such as a cell in advance, it is possible to determine whether or not the biological particle is the recovery target particle on the basis of the feature similar to that used in flow cytometry. Furthermore, for example, by labeling the biological particle such as the cell with an antibody or dye (especially, a fluorescent dye), it is possible to determine whether or not the biological particle is the recovery target particle on the basis of a feature of a surface antigen of the biological particle.

In the embodiment in which the image is acquired, the determination unit 105 included in the control unit 103 determines whether or not the biological particle is the recovery target particle on the basis of the acquired image (for example, the dark field image, bright field image, or both of them). For example, it may be determined whether or not the biological particle is the recovery target particle on the basis of one or a combination of two or more of the form, size, and color of the biological particle (especially, the cell).

The determination may be made, for example, by whether or not the information associated with the feature of the light meets a standard designated in advance. The standard may be a standard indicating that the biological particle is the recovery target particle. The standard may be appropriately set by one skilled in the art, and may be the standard regarding the feature of the light such as the standard used in the technical field of the flow cytometry and the like, for example.

One position in the sorting discrimination unit 156 may be irradiated with one light, or each of a plurality of positions in the sorting discrimination unit 156 may be irradiated with light. For example, the microchip 150 may be formed such that each of two different positions in the sorting discrimination unit 156 is irradiated with the light (that is, there are two positions irradiated with the light in the sorting discrimination unit 156). In this case, for example, it may be determined, on the basis of the light (for example, fluorescence and/or scattered light) generated by irradiating the biological particle in one position with light, whether or not the biological particle is the recovery target particle. Moreover, a velocity of the biological particle in the channel may be calculated on the basis of a difference between detection time of the light generated by the light irradiation in the one position and detection time of the light generated by the light irradiation in another position. For the calculation, a distance between two irradiation positions may be determined in advance, and the velocity of the biological particle may be determined on the basis of a difference between the two detection times and the distance. Moreover, on the basis of the velocity, arrival time at the particle sorting unit 157 described below may be accurately predicted. As the arrival time is accurately detected, it is possible to optimize a timing of forming a flow entering the biological particle recovery channel 159 (especially, a drive timing of the pressure changing element 107). Furthermore, in a case where a difference between an arrival time of a certain biological particle at the particle sorting unit 157 and an arrival time of a biological particle before or after the certain biological particle at the particle sorting unit 157 is equal to or less than a predetermined threshold value, it can also be determined that the certain biological particle is not to be recovered. In a case where a distance between the certain biological particle and a biological particle before or after the same is narrow, there is a high possibility that the biological particle before or after the same is recovered together when the certain biological particle is sucked. In a case where there is a high possibility that the biological particle before or after the same is recovered together, the recovery of the biological particle before or after the same can be prevented by determining that the certain biological particle is not to be sorted. Therefore, a purity of an intended biological particle among the recovered biological particles can be increased. Specific examples of the microchip in which each of two different positions in the sorting discrimination unit 156 is irradiated with light and the device including the microchip are disclosed in, for example, Japanese Patent Application Laid-Open No. 2014-202573.

Note that, the control unit 103 may control the light irradiation by the light irradiation unit 101 and/or the light detection by the detection unit 102. Furthermore, the control unit 103 may control drive of a pump for supplying a fluid into the biological particle sorting microchip 150. The control unit 103 may include, for example, a CPU, a memory, and a hard disk that stores an OS and a program for causing the biological particle sorting device 100 to execute a biological particle sorting method according to the present disclosure. For example, functions of the control unit 103 may be realized in a general-purpose computer. The program may be recorded in a recording medium such as, for example, a microSD memory card, an SD memory card, or a flash memory. The program recorded in the recording medium may be read by a drive (not illustrated) included in a biological particle sorting device 100, and then the control unit 103 may cause the biological particle sorting device 100 to execute the biological particle sorting method according to the present disclosure in accordance with the read program.

(2-4) Recovery Step

At the recovery step S3, the biological particle determined to be the recovery target particle at the determination step S2 is recovered into the biological particle recovery channel 159. The recovery step S3 is performed in the particle sorting unit 157 in the microchip 150. In the particle sorting unit 157, the laminar flow that flows through the joined channel 155 separately flows to the two branching channels 158. The particle sorting unit 157 illustrated in FIG. 1 includes the two branching channels 158, but the number of the branching channels is not limited to two. The particle sorting unit 157 may be provided with, for example, one or a plurality of (for example, two, three, or four) branching channels. The branching channel may be formed to branch into a Y shape on one plane as illustrated in FIG. 1, or may be formed to branch three-dimensionally.

Figure 5A:
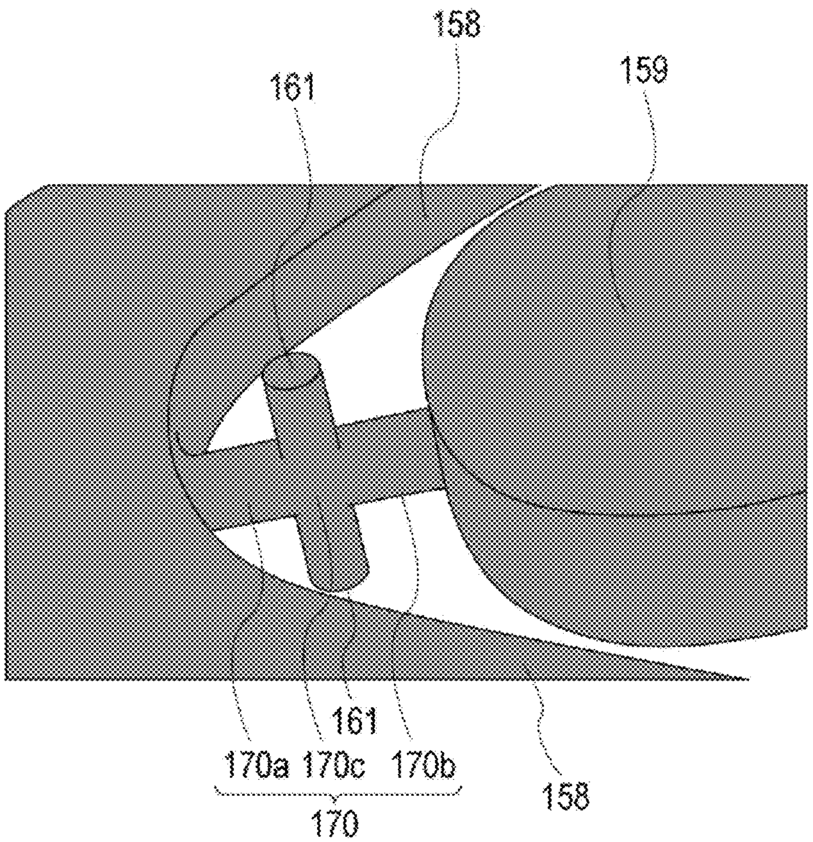
FIG. 5A is a schematic enlarged view of an example of a connection channel part.
Figure 5B:
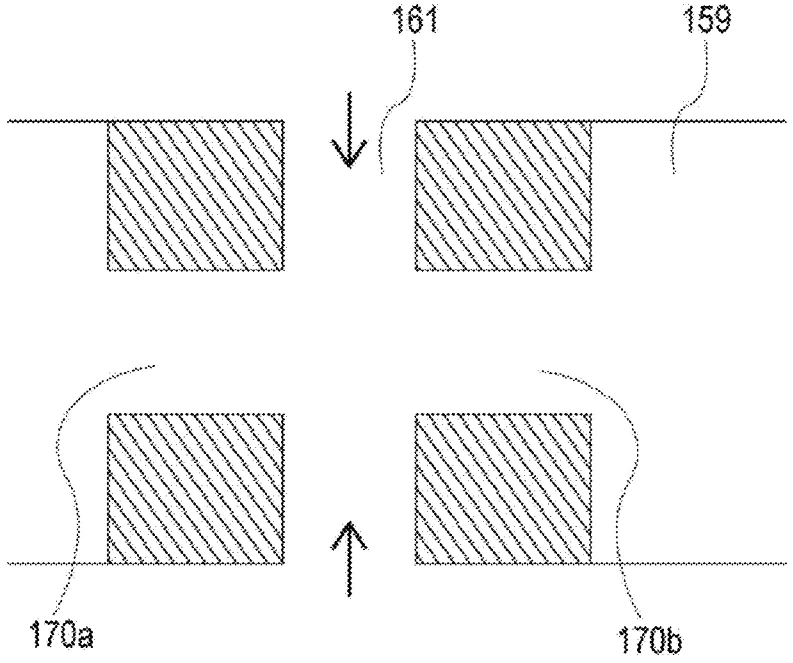
FIG. 5B is a schematic enlarged view of an example of the connection channel part.

FIGS. 5A and 5B are enlarged views of the vicinity of the connection channel 170. FIG. 5A is a schematic perspective view of the vicinity of the connection channel 170. FIG. 5B is a schematic cross-sectional view on a plane passing through a center line of the introduction channel 161 and a center line of the connection channel 170. The connection channel 170 includes a channel 170*a* on a side of the sorting discrimination unit 156 (hereinafter, also referred to as an upstream side connection channel 170*a*), a channel 170*b* on a side of the biological particle recovery channel 159 (hereinafter, also referred to as a downstream side connection channel 170*b*), and a connection 170*c* between the connection channel 170 and the introduction channel 161. The introduction channel 161 is provided so as to be substantially perpendicular to an axis of the channel of the connection channel 170. In FIGS. 5A and 5B, two introduction channels 161 are provided so as to face each other in substantially the center position of the connection channel 170, but it is also possible that only one introduction channel is provided.

A shape and a dimension of a cross-section of the upstream side connection channel 170*a* may be the same as a shape and a dimension of the downstream side connection channel 170*b*. For example, as illustrated in FIGS. 5A and 5B, both the cross-section of the upstream side connection channel 170*a* and the cross-section of the downstream side connection channel 170*b* may be substantially circular with the same dimension. Alternatively, both the two cross-sections may be rectangles (for example, squares or rectangles) having the same dimension.

The liquid is supplied from the two introduction channels 161 to the connection channel 170 as indicated by arrows in FIG. 5B. The liquid flows from the connection 170*c* to both the upstream side connection channel 170*a* and the downstream side connection channel 170*b*.

In a case where the recovery step is not performed, the liquid flows as follows.

The liquid that flows to the upstream side connection channel 170*a* exits from a connection surface to the joined channel 155 of the connection channel 170, and then flows separately to the two branching channels 158. Since the liquid exits from the connection surface in this manner, it is possible to prevent the liquid and the biological particle that do not need to be recovered into the biological particle recovery channel 159 from entering the biological particle recovery channel 159 through the connection channel 170.

The liquid that flows to the downstream side connection channel 170*b* flows into the biological particle recovery channel 159. Therefore, the biological particle recovery channel 159 is filled with the liquid.

Also in a case where the recovery step is performed, the liquid may be supplied from the two introduction channels 161 to the connection channel 170. However, due to pressure fluctuation in the biological particle recovery channel 159, especially, by generating a negative pressure in the biological particle recovery channel 159, a flow from the joined channel 155 through the connection channel 170 to the biological particle recovery channel 159 is formed. That is, a flow is formed from the joined channel 155 through the upstream side connection channel 170*a*, the connection 170*c*, and the downstream side connection channel 170*b* in this order to the biological particle recovery channel 159. Therefore, the recovery target particle is recovered into the biological particle recovery channel 159.

Figure 6A:
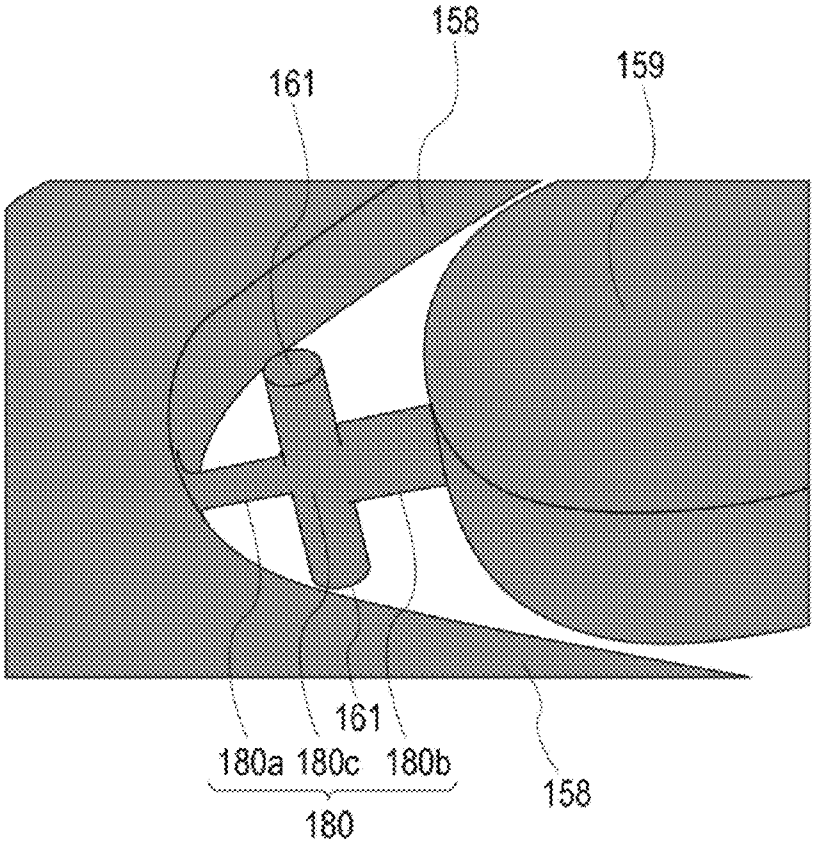
FIG. 6A is a schematic enlarged view of an example of the connection channel part.
Figure 6B:
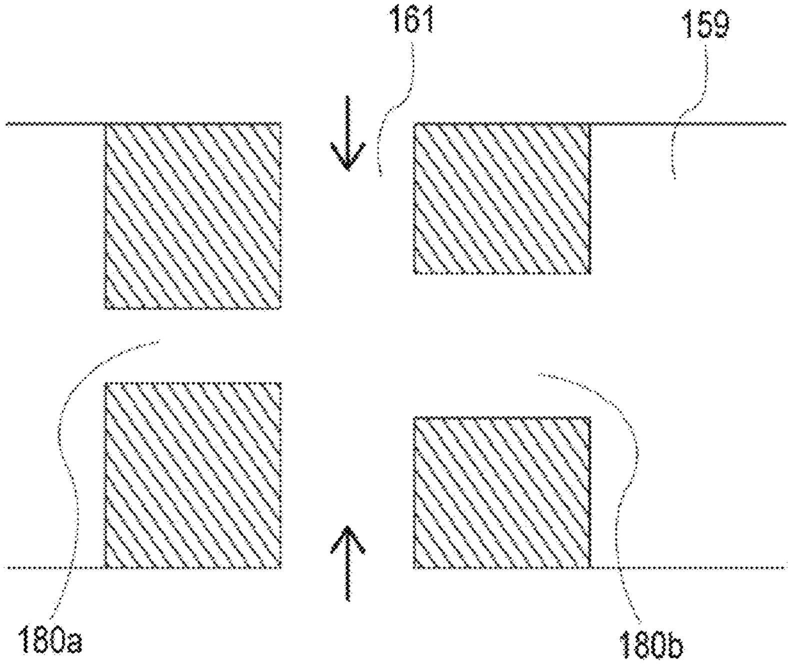
FIG. 6B is a schematic enlarged view of an example of the connection channel part.

The shape and/or dimension of the cross-section of the upstream side connection channel 170*a* may be different from the shape and/or dimension of the downstream side connection channel 170*b*. Examples in which the dimensions of the two channels are different from each other are illustrated in FIGS. 6A and 6B. As illustrated in FIGS. 6A and 6B, a connection channel 180 includes a channel 180*a* on a side of the sorting discrimination unit 156 (hereinafter, also referred to as an upstream side connection channel 180*a*), a channel 180*b* on a side of the biological particle recovery channel 159 (hereinafter, also referred to as a downstream side connection channel 180*b*), and a connection 180*c* between the connection channel 180 and the introduction channel 161. Both a cross-section of the upstream side connection channel 180*a* and a cross-section of the downstream side connection channel 180*b* have substantially circular shapes, but a diameter of the cross-section of the latter is larger than a diameter of the cross-section of the former. By making the diameter of the cross-section of the latter larger than that of the former, as compared with a case where the diameters of both are the same, it is possible to more effectively prevent the recovery target particle already sorted into the biological particle recovery channel 159 from being emitted to the joined channel 155 through the connection channel 180 immediately after the biological particle sorting operation by the negative pressure described above.

For example, in a case where both the cross-section of the upstream side connection channel 180*a* and the cross-section of the downstream side connection channel 180*b* are rectangular, by making an area of the cross-section of the latter larger than an area of the cross-section of the former, it is possible to more effectively prevent the already recovered biological particle from being emitted to the joined channel 155 through the connection channel 180 as described above.

Figure 7:
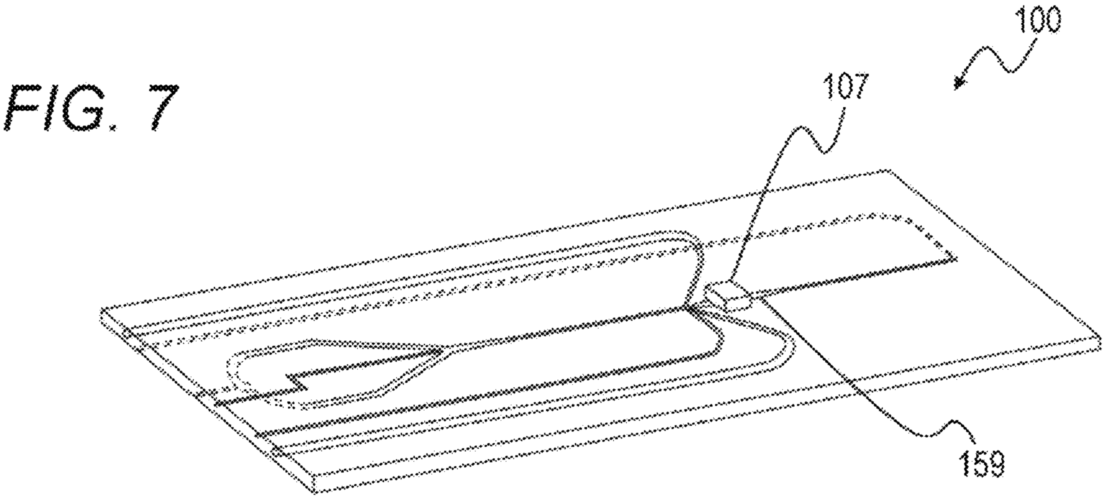
FIG. 7 is a view schematically illustrating a state in which a pressure changing element is in contact with the biological particle sorting microchip.

At the recovery step S3, due to the pressure fluctuation in the biological particle recovery channel 159, the recovery target particle is recovered into the biological particle recovery channel through the connection channel. The recovery may be performed, for example, by generating the negative pressure in the biological particle recovery channel 159 as described above. For example, as illustrated in FIG. 7, the negative pressure can be generated when a wall defining the biological particle recovery channel 159 is deformed by the pressure changing element (also referred to as an actuator) 107 attached to the outside of the microchip 150. The pressure changing element 107 may be, for example, a piezo actuator. The negative pressure may form the flow entering the biological particle recovery channel 159. In order to generate the negative pressure, the pressure changing element 107 can be attached to the outside of the microchip 150 so that the wall of the biological particle recovery channel 159 can be deformed, for example, as illustrated in FIG. 7. Due to the deformation of the wall, an inner space of the biological particle recovery channel 159 is changed, and the negative pressure may be generated. The pressure changing element 107 can be, for example, a piezo actuator. When the recovery target particle is sucked into the biological particle recovery channel 159, the sample liquid that forms the laminar flow or the sample liquid and the sheath liquid that form the laminar flow may also flow to the biological particle recovery channel 159. In this manner, the recovery target particle is sorted in the particle sorting unit 157 and recovered into the biological particle recovery channel 159.

The connection channel 170 is provided with the introduction channel 161 in order to prevent the biological particle that is not the recovery target particle from entering the biological particle recovery channel 159 through the connection channel 170. The liquid is introduced into the connection channel 170 from the introduction channel 161. By the introduction of the liquid, the connection channel 170 is filled with the liquid. Moreover, since a flow from the connection channel 170 to the joined channel 155 is formed by a part of the liquid, it is possible to prevent the biological particle other than the recovery target particle from entering the biological particle recovery channel 159. The liquid that forms the flow from the connection channel 170 to the joined channel 155 flows, by the flow of the liquid that flows through the joined channel 155 to the branching channel 158, through the branching channel 158 in a manner similar to the liquid without flowing in the joined channel 155.

Note that, the rest of the liquid introduced into the connection channel 170 flows to the biological particle recovery channel 159. Therefore, the biological particle recovery channel 159 may be filled with the liquid.

The flow that flows to the branching channel 158 may be discharged out of the microchip at the branching channel terminal 160. Furthermore, the recovery target particle recovered into the biological particle recovery channel 159 may be discharged out of the microchip at the recovery channel terminal 163. A container may be connected to the recovery channel terminal 163 via a channel such as a tube. The recovery target particle may be recovered into the container.

As illustrated in FIGS. 1 and 3, in the biological particle sorting microchip used in the present disclosure, the joined channel, the connection channel, and the recovery channel may be linearly arranged. In a case where these three channels are arranged linearly (especially, coaxially), it is possible to more effectively perform the recovery step as compared with a case where the connection channel and the recovery channel are arranged at an angle with respect to the joined channel, for example. For example, a suction amount required for guiding the recovery target particle to the connection channel may be further reduced.

Furthermore, in the biological particle sorting microchip used in the present disclosure, the biological particles are arrayed substantially in a line in the joined channel and flow toward the connection channel. Therefore, the suction amount at the recovery step may be reduced.

As described above, in the biological particle sorting microchip used in the present disclosure, the liquid is supplied from the introduction channel to the connection channel. Therefore, a flow from a connection position between the introduction channel and the connection channel toward the joined channel is formed in the connection channel, and it is possible to prevent the liquid that flows through the joined channel from entering the connection channel and prevent the biological particle other than the recovery target particle from flowing to the recovery channel through the connection channel. When performing the recovery step, as described above, for example, due to the negative pressure generated in the recovery channel, the recovery target particle is recovered into the recovery channel through the connection channel.

(2-5) Biological Particle Sorting Microchip and Biological Particle

In the present disclosure, "micro" means that at least a part of a channel included in the biological particle sorting microchip has a dimension on the order of μm, and especially has a cross-sectional dimension on the order of μm. That is, in the present disclosure, the "microchip" refers to a chip including a channel on the order of μm, especially a chip including a channel having a cross-sectional dimension on the order of μm. For example, a chip including a particle sorting unit including a channel having a cross-sectional dimension on the order of μm may be referred to as a microchip according to the present disclosure. For example, in the particle sorting unit 157, a cross-section of the joined channel 155 is, for example, a rectangle, and a width of the joined channel 155 is, for example, 100 μm to 500 μm, and especially 100 μm to 300 μm in the particle sorting unit 157. A width of the branching channel that branches from the joined channel 155 may be smaller than the width of the joined channel 155. The cross-section of the connection channel 170 is, for example, circular, and a diameter of the connection channel 170 at the connection between the connection channel 170 and the joined channel 155 may be, for example, 10 μm to 60 μm, and especially 20 μm to 50 μm. These dimensions regarding the channel may be appropriately changed depending on a size of the biological particle, especially, the size of the recovery target particle.

The biological particle sorting microchip 150 may be manufactured by a method known in the art. For example, the biological particle sorting microchip 150 may be manufactured by adhering two or more substrates on which a predetermined channel is formed. The channel may be formed on, for example, all of the two or more substrates (especially, the two substrates), or formed on only a part of the two or more substrates (especially, one of the two substrates). In order to more easily adjust a position when the substrates are adhered, it is preferable that the channel is formed on only one substrate. For example, it is possible to create the channel structure in which the two channels are provided in different positions in the optical axis direction (so as not to communicate with each other) and so as to intersect with each other in a case of being seen in the optical axis direction as indicated by the dotted line and the solid line in FIG. 1 by stacking three or more substrates on which the channel is provided.

Materials known in the art may be used as a material for forming the biological particle sorting microchip 150. Examples include, but are not limited to, for example, polycarbonate, cycloolefin polymer, polypropylene, polydimethylsiloxane (PDMS), polymethylmethacrylate (PMMA), polyethylene, polystyrene, glass, and silicon. Especially, polymer materials such as polycarbonate, cycloolefin polymer, and polypropylene, for example, are particularly preferable because they are excellent in processability and may manufacture a microchip inexpensively using a molding device.

The biological particle sorting microchip 150 is preferably transparent. For example, in the biological particle sorting microchip 150, at least a portion through which light (laser light and scattered light) passes is transparent, and for example, the sorting discrimination unit may be transparent. The entire biological particle sorting microchip 150 may be transparent.

Note that, in the description above, the embodiment in which the above-described channel group is formed in the disposable biological particle sorting microchip 150 is described, but in the present disclosure, it is also possible that the above-described channel group is not formed in the microchip 150. For example, the above-described channel group may be formed in a substrate such as plastic or glass, for example. Furthermore, the above-described channel group may have a two-dimensional or three-dimensional structure.

In the present disclosure, the biological particle may be the particle having a dimension capable of flowing in the channel in the biological particle sorting microchip. In the present disclosure, the biological particle may be appropriately selected by those skilled in the art. In the present disclosure, the biological particle includes biologic biological particles such as cells, cell masses, microorganisms, exosomes, and liposomes. Note that synthetic biological particles such as gel particles, beads, latex particles, polymer particles, and industrial particles may be subjected to the sorting operation by the biological particle sorting device according to the present disclosure, for example, in order to optimize a sorting condition setting performed before the biological particle sorting operation.

The biological particles may include chromosomes forming various cells, liposomes, mitochondria, organelles (cell organelles) and the like. The cells may include animal cells (such as hemocyte cells) and plant cells. The cells may be, especially, blood cells or tissue cells. The blood cells may be floating cells such as T cells and B cells, for example. The tissue cells may be, for example, adherent cultured cells, adherent cells separated from the tissue or the like. The cell masses described above may include, for example, spheroids and organoids. The microorganisms may include bacteria such as *Escherichia coli*, viruses such as tobacco mosaic virus, fungi such as yeast, and the like. Moreover, the biologic biological particles may also include biological polymers such as nucleic acids, proteins, and complexes thereof. These biological polymers may be, for example, extracted from the cells or may be contained in blood samples or other liquid samples.

A shape of the biological particle may be spherical or substantial spherical or non-spherical. A size and mass of the biological particle may be appropriately selected by one skilled in the art depending on a size of the channel of the microchip. On the other hand, the size of the channel of the microchip may also be appropriately selected in accordance with the size and the mass of the biological particle. In the present disclosure, a chemical or biological label such as fluorescent dye or fluorescent protein, for example, may be attached to the biological particle as needed. The label may further facilitate detection of the biological particle. The label that should be attached may be appropriately selected by one skilled in the art. Molecules that specifically react with the biological particles (for example, antibodies, aptamers, DNA, RNA or the like) may bind to the label.

According to one embodiment of the present disclosure, the biological particle may be, especially, a cell. Furthermore, the sample to be subjected to the sorting processing by the biological particle sorting device of the present disclosure may be, for example, a biological sample, especially, a biological sample containing a cell population, more especially, a biological sample containing an immune cell population. The cell population may especially include a cell to be sorted and a cell not to be sorted.

(3) Drive Waveform Adjustment

(3-1) Description Regarding Occurrence of Cavitation and Drive Waveform Adjustment for Preventing the Occurrence of Cavitation

(3-1-1) Occurrence of Cavitation Accompanying Improvement in Sorting Efficiency The biological particle sorting device described in (2) described above sorts a biological particle determined to be sorted by driving the pressure changing element 107.

The control unit included in the biological particle sorting device may be configured to determine not to execute sorting of a certain biological particle in order to prevent sorting of another biological particle in a case where the another biological particle that should not be sorted is present near the certain biological particle even if a characteristic of light generated from the certain biological particle indicates that the biological particle is a sorting target.

For example, an example is assumed in which intended cells are sorted from a biological sample containing the intended cells and unintended cells by a biological particle sorting device. In this example, it is assumed that a detection unit of the biological particle sorting device detects light generated from a certain cell, and the light has a characteristic indicating that the certain cell is an intended cell. However, in a case where an unintended cell is present in the vicinity of the certain cell, there is a possibility that the unintended cell is also sorted if sorting of the certain cell is executed. Therefore, in the above case, a determination unit determines that sorting is not to be executed depending on a targeted purity of the intended cell or the like.

In this manner, the number of times of detection in which light indicating an intended particle is detected does not necessarily coincide with the number of times of sorting execution in which sorting is executed. In the present specification, a percentage of the number of times of detection to the number of times of sorting execution is referred to as sorting efficiency (also referred to as “Efficiency”). The sorting efficiency is represented by, for example, a mathematical expression of (sorting efficiency)=(the number of times of sorting execution/the number of times of detection)×100.

The sorting efficiency is desirably as high as possible. In order to enhance the sorting efficiency, for example, it is conceivable to shorten a drive time of the pressure changing element 107. However, it has been found that cavitation occurs, for example, in a case where the number of times of sorting processing per unit time (for example, corresponding to the number of times of driving of the pressure changing element) is large in a case where the drive time is short.

Therefore, the present inventors have found that drive waveform adjustment based on information associated with the number of times of sorting processing per unit time or information associated with a percentage or the number of sorting target particles contained in a unit sample is useful for preventing the occurrence of cavitation. By the drive waveform adjustment, it is also possible to enhance the sorting efficiency while preventing the occurrence of cavitation.

(3-1-2) Utility of Drive Waveform Adjustment in Setting of Sorting Condition Parameter Furthermore, for example, it is conceivable to adjust a sorting condition parameter in accordance with a purity or a collection rate (also referred to as “Recovery”) of intended particles. Examples of the sorting condition parameter include a time Td (also referred to as a “delay time”) from time when light generated from a particle determined to be sorted has been detected to time when the pressure changing element is driven for sorting of the biological particle, a drive voltage V applied to the pressure changing element, and a time Th (also referred to as a “holding time”) for which the drive voltage V applied to the pressure changing element is maintained. These will be described with reference to FIGS. 8A and 8B.

Figure 8A:
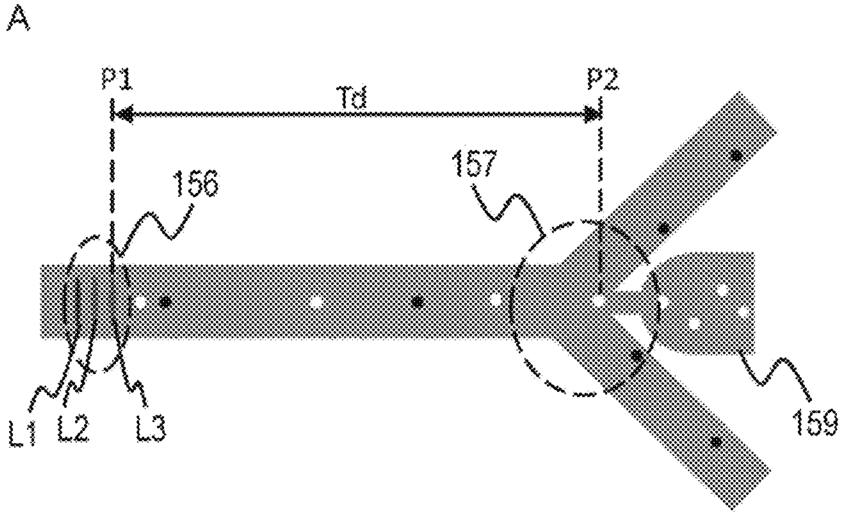
FIG. 8A is a schematic view of the biological particle sorting microchip for describing a delay time.

As illustrated in FIG. 8A, the delay time Td corresponds to, for example, a time until a biological particle reaches a point P2 where the pressure changing element 107 is driven from a point P1 where laser light L3 is emitted. The biological particle is recovered into the biological particle recovery channel 159 by driving the pressure changing element at time when the delay time Td has elapsed from the time when light generated by irradiating the biological particle with the laser light is detected. The collection rate can be enhanced by optimizing the delay time Td.

Note that a start time point of the delay time Td is not limited to a time point when the light generated by the irradiation of the biological particle with the laser light L3 is detected, and may be a time point when light generated by irradiation of the biological particle with any other laser light is detected.

The drive voltage V is a voltage to be applied to the pressure changing element, and especially corresponds to a maximum voltage value to be applied or a voltage at the holding time Th to be described later. An example of a voltage waveform to be applied to the pressure changing element is illustrated in a of FIG. 8B. As illustrated in a of FIG. 8B, a drive waveform of the voltage applied to the pressure changing element is a shape of a plot of a voltage value with respect to time. The drive waveform is divided into portions of a step-down time Tf, the holding time Th, and a step-up time Tr. A state before the drive time starts is illustrated in b of FIG. 8B.

In the step-down time Tf, the voltage value applied to the pressure changing element decreases. Therefore, as illustrated in c1 of FIG. 8B, the pressure changing element 107 is deformed such that the pressure in the biological particle recovery channel 159 decreases (a negative pressure is generated in the same channel). That is, the pressure changing element 107 is deformed such that the volume in the same channel increases.

In the holding time Th, the voltage value applied to the pressure changing element is maintained at a value decreased in the step-down time Tf. Therefore, the deformed state of the pressure changing element 107 is maintained such that the state in which the pressure in the biological particle recovery channel 159 has decreased (the negative pressure in the same channel) is maintained. That is, the increased volume in the same channel is maintained, for example, the state illustrated in c1 of FIG. 8B is maintained.

In the step-up time Tr, the voltage value applied to the pressure changing element increases. More specifically, the voltage value returns to a voltage value immediately before the step-down time Tf. Therefore, as illustrated in d1 of FIG. 8B, the pressure changing element 107 is deformed such that the pressure in the biological particle recovery channel 159 increases (such that the volume in the same channel increases), and the pressure in the biological particle recovery channel 159 returns to a state immediately before the step-down time Tf. That is, the volume in the same channel returns to a state immediately before the step-down time Tf.

Figure 8B:
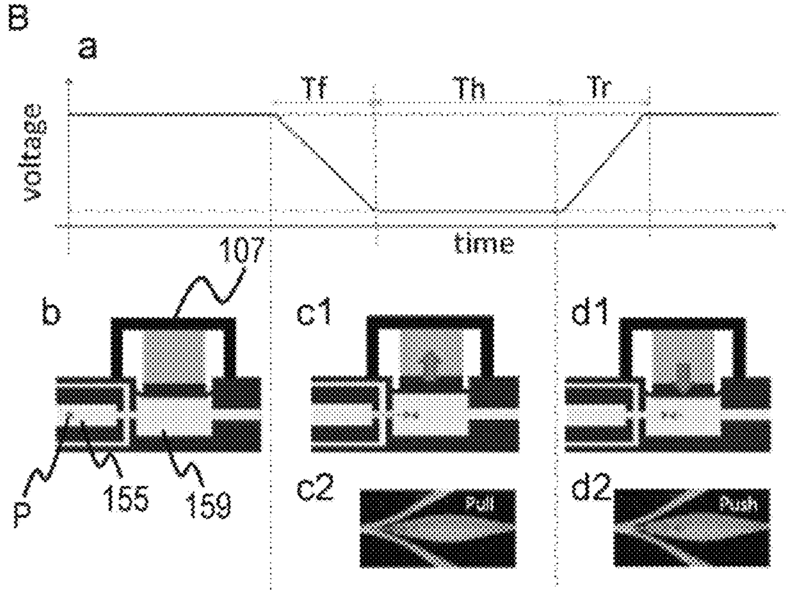
FIG. 8B is a view illustrating an example of a drive waveform and a relationship between the drive waveform and a change in a channel.

In the step-down time Tf and the holding time Th, as illustrated in c2 of FIG. 8B, a sorting target particle is sucked into the biological particle recovery channel 159 by the negative pressure. In the step-up time Tr, as illustrated in d2 of FIG. 8B, a flow toward the joined channel 155 may be formed for the sorting target particle, but the sorting target particle does not exit from the biological particle recovery channel 159 to the joined channel 155.

The collection rate of intended particles can be improved by adjusting the delay time Td, the drive voltage V, and the holding time Th. However, if an attempt is made to enhance the collection rate, for example, in a case where the number of detected sorting target particles per unit time is large, for example, the number of times of driving of the pressure changing element 107 per unit time increases. The increase in the number of times of driving causes the occurrence of cavitation, that is, generation of bubbles in the channel. Therefore, in parameter adjustment for improving the collection rate, it is extremely useful to adjust the drive waveform in order to prevent the occurrence of cavitation.

Figure 9:
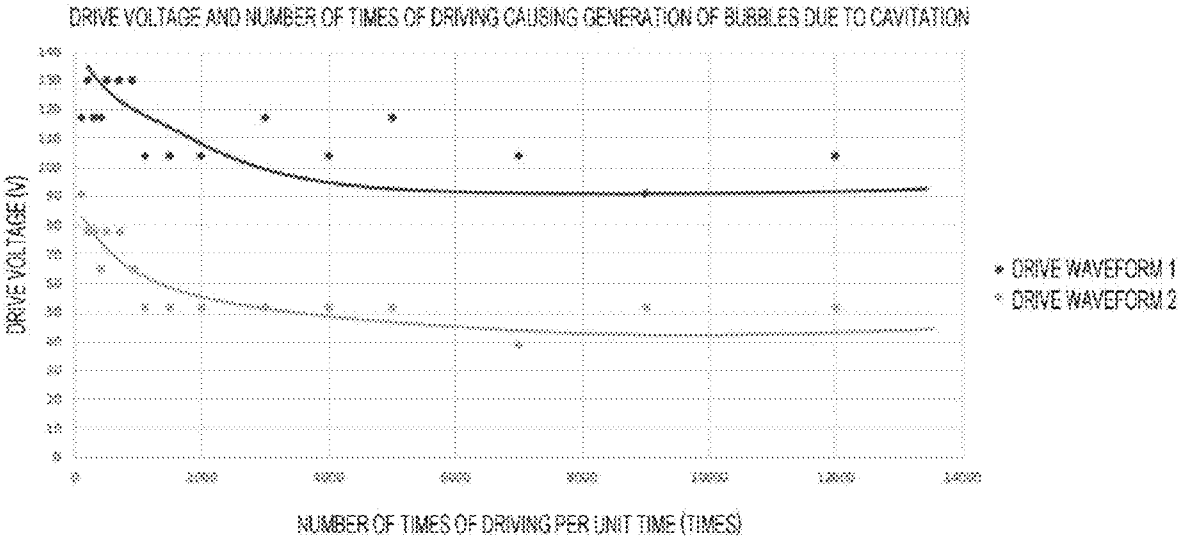
FIG. 9 is a graph for describing a relationship between the number of times of driving and the occurrence of cavitation.
Figure 10:
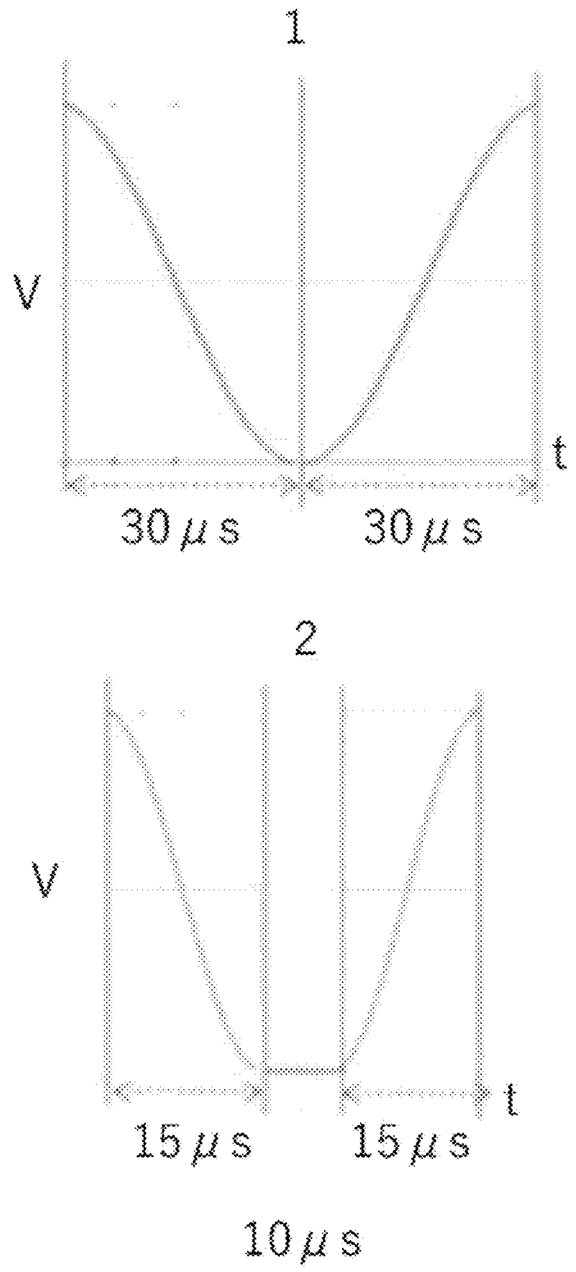
FIG. 10 is a view for describing an example of the drive waveform.

(3-1-3) Relationship Between Number of Times of Driving and Occurrence of Cavitation Next, a relationship between the number of times of driving and the occurrence of cavitation will be described with reference to FIG. 9. FIG. 9 is a graph obtained by plotting the number of times of driving per unit time and a drive voltage with which the occurrence of cavitation was observed in a case where Drive waveform 1 (black) or Drive waveform 2 (light gray) was adopted. FIG. 10 illustrates shapes of Drive waveforms 1 and 2. As illustrated in FIG. 10, a drive time of Drive waveform 1 is 60 μs (step-down time of 30 μs+holding time of 0 μs+step-up time of 30 μs=60 μs). A drive time of Drive waveform 2 is 40 μs (step-down time of 15 μs, holding time of 10 μs, and step-up time of 15 μs). The drive time of Drive waveform 1 is longer than the drive time of Drive waveform 2. Furthermore, the step-up time and the step-down time of Drive waveform 1 are longer than those of Drive waveform 2.

As illustrated in FIG. 9, for example, regarding the case of adopting Drive waveform 1 (indicated in black), the cavitation has occurred in a case where the number of times of driving per unit time is 2000 times and the drive voltage is about 105 V. In this case, cavitation also occurs in a case where the number of times of driving per unit time is more than 2000 times. In this manner, cavitation occurs even in a case where the number of times of driving per unit time or the drive voltage is greater than the plot results illustrated in FIG. 9.

Regarding the case of adopting Drive waveform 2 as well, cavitation occurs even in a case where the number of times of driving per unit time or the drive voltage is greater than that in the case of resulting in the plot results where the occurrence of cavitation has been observed.

From these plots, it can be seen that the occurrence of cavitation can be avoided by increasing the drive time in a case where the number of times of driving per unit time is large. Furthermore, cavitation does not occur even if the drive time is shortened to some extent in a case where the number of times of driving per unit time is small. Therefore, in this case, the sorting efficiency can be improved by shortening the drive time.

(3-1-4) Relationship Between Drive Time and Suction Amount with Respect to Particle Sorting Channel Next, a relationship between a drive time and a suction amount with respect to the particle sorting channel will be described with reference to FIG. 11. Note that Drive waveforms 1 and 2 illustrated in FIG. 11 are the same as Drive waveforms illustrated in FIG. 10.

Figure 11:
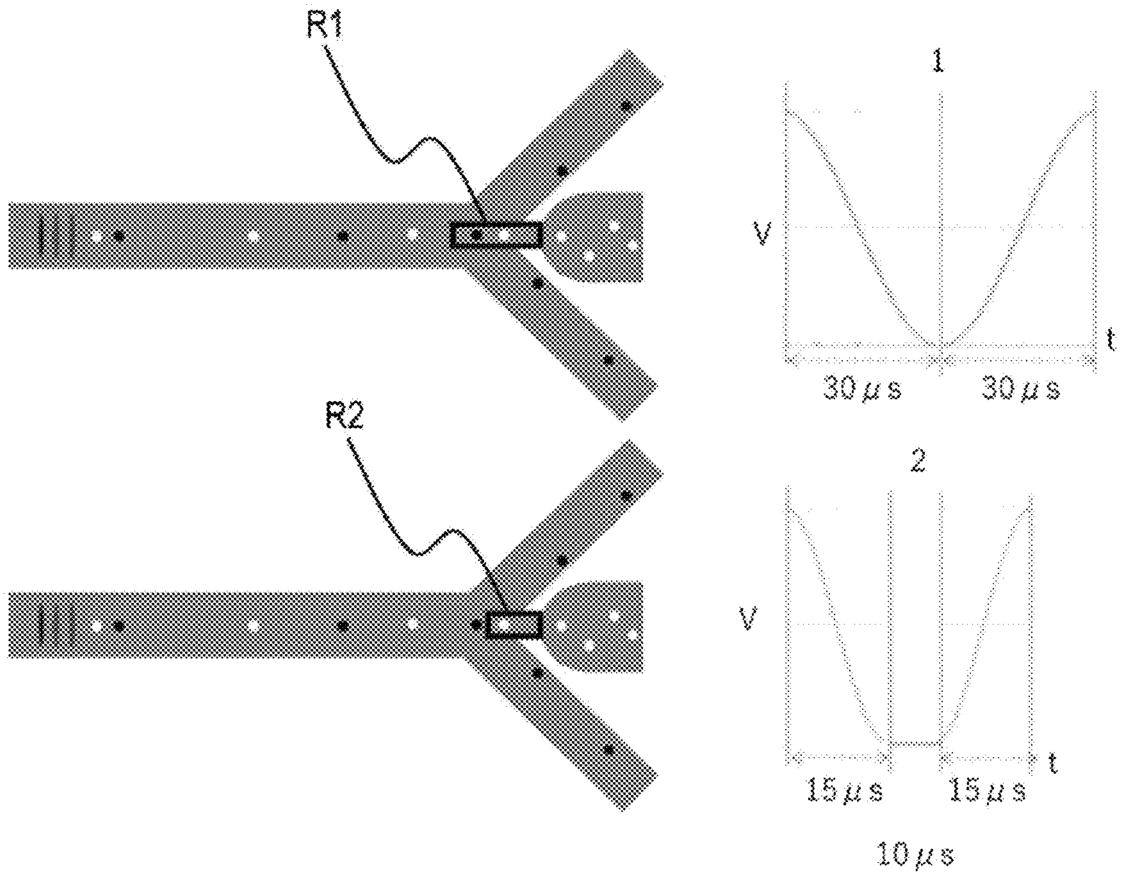
FIG. 11 is a view for describing a relationship between a drive time and a suction amount with respect to a particle sorting channel.

Since Drive waveform 1 has a long drive time as illustrated in the upper part of FIG. 11, when the pressure changing element 107 is driven with Drive waveform 1, a biological particle present in a wider region R1 is sucked into the biological particle recovery channel 159. Therefore, for example, as illustrated in the upper part of the drawing, not only a particle (white) determined to be sorted but also a particle (black) flowing after the particle is also recovered.

On the other hand, since Drive waveform 2 has a short drive time as illustrated in the lower part of the drawing, the biological particle present in a region R2 narrower than the region R1 is sucked into the biological particle recovery channel 159. Therefore, for example, as illustrated in the lower part of the drawing, the particle (white) determined to be sorted is recovered, but the particle (black) flowing thereafter is not recovered.

From the relationship between the drive time and the suction amount, if execution of sorting of a sorting target particle is not allowed in a case where the drive time is long and another particle is present in the vicinity of the sorting target particle, the purity of intended particles can be enhanced.

(3-1-5) Basic Concept of Present Disclosure

A biological particle sorting device of the present disclosure includes: a pressure changing element that changes a pressure in a channel in which a biological particle determined to be sorted is recovered; and a control unit that drives the pressure changing element. The control unit is configured to adjust a drive waveform of the pressure changing element on the basis of information associated with the number of times of sorting processing per unit time or information associated with a percentage or the number of sorting target particles contained in a unit sample. Therefore, it is possible to prevent the occurrence of cavitation described above. Moreover, the sorting efficiency can also be enhanced.

The channel whose internal pressure is changed by the pressure changing element corresponds to, for example, the biological particle recovery channel 159 in the biological particle sorting device 100 described in (2) above. Furthermore, the pressure changing element corresponds to the pressure changing element 107 in the same device. The control unit corresponds to the control unit 103 in the same device.

The biological particle sorting device of the present disclosure may be configured to change the pressure in the channel by driving the pressure changing element. In the present specification, a waveform of a voltage applied to drive the pressure changing element is referred to as a drive waveform. Especially, the drive waveform may correspond to a plot shape that appears in a case where the voltage is plotted with respect to time. An example of the drive waveform is as illustrated in FIG. 8B or 10.

The drive waveform is specified by elements such as a drive time and a drive voltage. The drive time is a time for which a voltage is applied to the pressure changing element in order to drive the pressure changing element. The drive voltage is a voltage applied to the pressure changing element in order to drive the pressure changing element. In the present disclosure, the control unit may adjust the drive time, the drive voltage, or both the drive time and the drive voltage among the elements of the drive waveform.

The drive time may be divided into three of, for example, a step-down time, a holding time, and a step-up time. The step-down time is a time for which the voltage to be applied decreases. The holding time is a time for which the voltage to be applied is maintained at a predetermined voltage within the drive time. The step-up time is a time for which the voltage to be applied rises. For example, in order to drive the pressure changing element for sorting processing of one biological particle, the voltage applied to the pressure changing element is lowered, the voltage is maintained at the predetermined value, and thereafter, the voltage is raised.

In the present disclosure, the control unit may adjust one or more of the step-up time, the step-down time, and the holding time among the elements of the drive waveform.

The adjustment is adjustment for increasing or shortening the drive time. In order to increase the drive time, for example, one or more of the step-down time, the holding time, and the step-up time may be increased. In order to shorten the drive time, for example, one or more of the step-down time, the holding time, and the step-up time may be shortened.

A plurality of drive waveforms of voltages to be applied to the pressure changing element may be prepared in advance. In the present disclosure, in adjusting the drive waveform, the control unit may select a drive waveform to be applied from among a plurality of types of drive waveforms set in advance on the basis of either the information associated with the number of times of sorting processing or the information associated with the percentage or the number of the sorting target particles.

(3-2) Drive Waveform Adjustment Based on Information Associated with Number of Times of Sorting Processing In one embodiment of the present disclosure, the control unit adjusts the drive waveform of the pressure changing element on the basis of the information associated with the number of times of sorting processing per unit time. The sorting processing may be sorting processing in which it is determined to sort a biological particle at the determination step S2 described in (2) described above, and then the recovery step S3 is performed on the biological particle. Therefore, the number of times of sorting processing may be, for example, the number of times a determination is made to sort a biological particle at the determination step S2, or the number of times of execution of the recovery step S3.

As described in (2) above, the control unit 103 drives the pressure changing element 107 to change the pressure in the biological particle recovery channel 159 in order to recover the biological particle determined to be sorted into the biological particle recovery channel 159. Therefore, the number of times of sorting processing may be the number of times of driving of the pressure changing element 107.

That is, in a preferred embodiment of the present disclosure, the number of times of sorting processing per unit time may be the number of times the pressure changing element 107 is driven per unit time.

In this embodiment, the control unit 103 counts the number of times of driving of the pressure changing element 107. The control unit 103 adjusts the drive waveform of the pressure changing element 107 on the basis of information associated with the counted number of times.

As described in (2) above, a biological particle flowing through the sorting discrimination unit 156 is irradiated with light. Although FIG. 8 illustrates three laser light irradiation points L1 to L3 in the sorting discrimination unit 156, but the number of beams of laser light to be emitted is not limited thereto, and may be, for example, any of 1 to 5, especially any of 2 to 5. The detection unit 102 detects light generated by the light irradiation. On the basis of a feature of the light detected by the detection unit 102, the determination unit 105 determines whether or not the biological particle is the recovery target particle. Therefore, the number of times of sorting processing may be the number of times a determination is made to sort a biological particle in the determination.

That is, in another preferred embodiment of the present disclosure, the number of times of sorting processing per unit time may be the number of times a determination is made to sort a biological particle in the determination per unit time.

In this embodiment, the control unit 103 counts the number of times a determination is made to sort a biological particle by the determination. The control unit 103 adjusts the drive waveform of the pressure changing element 107 on the basis of information associated with the counted number of times.

An example of drive waveform adjustment will be described below.

The biological particle sorting device (especially, the control unit) increases the drive time, lowers the drive voltage, or executes both of them (both the increase of the drive time and the lowering of the drive voltage) in a case where the number of times of sorting processing is equal to or more than a predetermined value (or more than the predetermined value).

On the contrary, the biological particle sorting device (especially, the control unit) shortens the drive time, increases the drive voltage, or executes both of them (both the shortening of the drive time and the increase of the drive voltage) in a case where the number of times of sorting processing is less than the predetermined value (or equal to or less than the predetermined value).

Such adjustment is preferable for achieving both suppression of the occurrence of cavitation and maximization of the sorting efficiency. That is, the control unit may adjust the drive waveform so as to suppress the occurrence of cavitation in the channel on the basis of the information associated with the number of times of sorting processing per unit time.

Note that the predetermined value referred to for executing the drive waveform adjustment is also referred to as a "threshold value" in the present specification.

The number of times of sorting processing per unit time may be a counted number of times of sorting processing or an estimated number of times of sorting processing. The counting or the estimation may be executed by, for example, the biological particle sorting device (especially, the control unit).

The counted number of times of sorting processing may be, for example, the number of times the pressure changing element is actually driven or the number of times the drive voltage is applied. Alternatively, the counted number of times of sorting processing may be the number of times a determination is made to sort a biological particle.

The estimated number of times of sorting processing may be obtained by counting the number of times of sorting processing in a certain time and calculating the estimated number of times of sorting processing on the basis of this counted number of times of sorting processing and a relationship between the certain time and the unit time.

The estimated number of times of sorting processing may be estimated on the basis of the number of times a determination has been made to execute sorting in a case where a sorting operation has been executed on a sample (especially, the number of times a determination is made to execute sorting in the unit time). For example, the control unit may acquire the number of times a determination is made to execute sorting in a parameter adjustment step to be described later, and then the control unit may estimate the number of times of sorting processing on the basis of this number of times.

Furthermore, the estimated number of times of sorting processing may be estimated on the basis of an existence ratio between a sorting target particle contained in the sample and the other particles. The existence ratio may be acquired in the parameter adjustment step to be described later, or may be a value input by a user, for example, in a case where the existence percentage is known to the user.

In the drive waveform adjustment, the control unit may select, for example, any of two drive waveforms in accordance with the number of times of sorting processing. The two drive waveforms may differ in the drive time, and may be a first drive waveform having a longer drive time and a second drive waveform having a shorter drive time. A drive voltage of the first drive waveform and a drive voltage of the second drive waveform may be the same or may be different.

The control unit may adopt the first drive waveform in a case where the number of times of sorting processing is equal to or more than the predetermined value (or more than the predetermined value), and may adopt the second drive waveform in a case where the number of times of sorting processing is less than the predetermined value (or equal to or less than the predetermined value).

The first drive waveform may be, for example, a drive waveform having a drive time of 50 μs or more, 55 μs or more, 57 μs or more, or 60 μs or more.

The drive time of the second drive waveform may be shorter than that of the first drive waveform. For example, the drive time of the second drive waveform may be shorter than the drive time of the first drive waveform by 5 μs or more, 10 μs or more, or 15 μs or more. In a case where the drive time of the first drive waveform is 60 μs, the drive time of the second drive waveform may be, for example, 55 μs or less, 50 μs or less, or 45 μs or less.

In the drive waveform adjustment according to the present disclosure, for example, the step-down time, the step-up time, or both of them may be changed. For example, the first drive waveform and the second drive waveform may differ in the step-down time, the step-up time, or both of them. For example, the control unit increases the step-down time, the step-up time, or both of them in a case where the number of times of sorting processing is equal to or more than the predetermined value (or more than the predetermined value). On the other hand, the control unit shortens the step-down time, the step-up time, or both in a case where the number of times of sorting processing is less than the predetermined value (or equal to or less than the predetermined value). To change the step-down time and/or the step-up time is especially effective for suppressing the occurrence of cavitation.

The first drive waveform may be, for example, a drive waveform in which a step-down time and/or a step-up time is 20 μs or more, 25 μs or more, 27 μs or more, or 30 μs or more.

A step-down time and/or a step-up time of the second drive waveform may be shorter than those of the first drive waveform. For example, the step-down time and/or the step-up time of the second drive waveform may be shorter by 5 μs or more, 10 μs or more, or 15 μs or more than the step-down time and/or the step-up time of the first drive waveform. In a case where the step-down time and/or the step-up time of the first drive waveform is 30 μs, the step-down time and/or the step-up time of the second drive waveform may be, for example, 25 μs or less, 20 μs or less, or 15 μs or less.

The first drive waveform and the second drive waveform may have holding times different from each other, or may have the same holding time. Furthermore, the first drive waveform and/or the second drive waveform does not necessarily have a holding time. The holding time in these drive waveforms may be, for example, 0 μs or more, 3 μs or more, or 5 μs or more. The holding time in these drive waveforms may be 20 μs or less, 15 μs or less, or 10 μs or less.

The holding time may be selected in accordance with a desired suction amount, for example. As the holding time is longer, the suction amount increases, and a recovery rate of the sorting target particle increases, but the possibility of recovering particles present before and after the sorting target particle also increases accordingly. As the holding time is shorter, the recovery rate of the sorting target particle decreases, but the possibility of recovering the particles present before and after the sorting target particle also decreases accordingly. Therefore, for example, the control unit may set the holding time in accordance with a desired purity of the sorting target particles. The control unit may set a shorter holding time in order to recover the sorting target particles with a higher purity.

The predetermined value may be appropriately selected in accordance with a sorting condition (for example, a sample to be subjected to the sorting processing by the biological particle sorting device, a microchip, or the like). As the predetermined value, for example, any value of 500 times or more, 1000 times or more, 2000 times or more, or 3000 times or more may be adopted. Furthermore, as the predetermined value, for example, any value of 20,000 times or less, 15000 times or less, 10,000 times or less, or 5000 times or less may be adopted. For example, in a case where the number of times of sorting processing per unit time is equal to or more than such a predetermined value (or more than the predetermined value), the control unit increases the step-down time, the step-up time, or both of them. On the other hand, in a case where the number of times of sorting processing per unit time is less than the predetermined value (or equal to or less than the predetermined value), the control unit shortens the step-down time, the step-up time, or both of them.

The drive voltage of the first drive waveform may be, for example, 1 V or more, 5 V or more, or 10 V or more. The drive voltage of the first drive waveform may be, for example, 1000 V or less, 500 V or less, or 300 V or less.

A numerical range described for the drive voltage of the first drive waveform is also applied to the drive voltage of the second drive waveform.

The drive voltage of the first drive waveform and the drive voltage of the second drive waveform may be the same, or may be different.

Furthermore, for example, in a case where a high drive voltage is adopted in the parameter adjustment step or a sorting processing step, which will be described later, the possibility of the occurrence of cavitation may increase. In this case, the possibility of the occurrence of cavitation can be lowered by increasing the drive time. Therefore, the control unit may adjust the drive waveform in accordance with the drive voltage adopted in the sorting processing. For example, the control unit may adopt the first drive waveform in a case where the drive voltage is equal to or more than (or is more than) a predetermined value, and the control unit may adopt the second drive waveform in a case where the drive voltage is less than (or is equal to or less than) the predetermined value.

Note that the first drive waveform and the second drive waveform may have different drive voltages.

In one embodiment, a drive voltage of the first drive waveform having a longer drive time may be higher than a drive voltage of the second drive waveform having a shorter drive time. The higher the drive voltage, the higher the possibility of the occurrence of cavitation. In a case where the drive time is longer, the possibility of the occurrence of cavitation is reduced, so that an increase of the drive voltage is allowed.

In another embodiment, the drive voltage of the first drive waveform having a longer drive time may be lower than the drive voltage of the second drive waveform having a shorter drive time. The lower the drive voltage, the lower the possibility of the occurrence of cavitation. Therefore, the possibility of the occurrence of cavitation can be further reduced by a drive waveform having a lower drive voltage as well as a longer drive time.

In still another embodiment of the present disclosure, in the drive waveform adjustment, for example, the control unit may select any of two drive waveforms in accordance with the number of times of sorting processing, and the two drive waveforms may differ only in the drive voltage. A first drive waveform having a lower drive voltage and a second drive waveform having a higher drive time may be used.

The control unit may adopt the first drive waveform in a case where the number of times of sorting processing is equal to or more than the predetermined value (or more than the predetermined value), and may adopt the second drive waveform in a case where the number of times of sorting processing is less than the predetermined value (or equal to or less than the predetermined value). The predetermined value may be the same as described above.

In the drive waveform adjustment, for example, the control unit may select any of three or more drive waveforms in accordance with the number of times of sorting processing. The three or more drive waveforms may differ in the drive time, and include a first drive waveform having the longest drive time, a second drive waveform having the shortest drive time, and one or more other drive waveforms having a drive time between the two drive times. The control unit may adopt the first drive waveform in a case where the number of times of sorting processing is equal to or more than a first predetermined value (or more than the first predetermined value), and may adopt the second drive waveform in a case where the number of times of sorting processing is equal to or less than a second predetermined value (or less than the second predetermined value). Furthermore, the control unit may adopt any of the one or more other drive waveforms in a case where the number of times of sorting processing is between the first predetermined value and the second predetermined value.

The first predetermined value and the second predetermined value may be appropriately selected in accordance with a sorting condition (for example, a sample to be subjected to the sorting processing by the biological particle sorting device, a microchip, or the like). These values may be, for example, 500 times or more, 1000 times or more, 2000 times or more, or 3000 times or more. Furthermore, these predetermined values may be, for example, 20,000 times or less, 15000 times or less, 10,000 times or less, or 5000 times or less.

In order to acquire information associated with the number of times of sorting processing, the control unit may be configured to count or estimate the number of times the pressure changing element is driven or the number of times a determination is made to sort a biological particle in the unit time.

The biological particle sorting device of the present disclosure may further include a determination unit that determines whether or not to sort a biological particle. The number of times a determination is made to execute sorting by the determination unit may be used as the above-described number of times a determination is made to execute sorting per unit time.

(3-3) Drive Waveform Adjustment Based on Information Associated with Percentage or Number of Sorting Target Particles In another embodiment of the present disclosure, the control unit adjusts the drive waveform of the pressure changing element on the basis of information associated with the percentage or the number of the sorting target particles contained in the unit sample.

For example, there is a case where a user of the biological particle sorting device according to the present disclosure has information associated with the percentage or the number of the sorting target particles contained in the unit sample in advance. In such a case, the user inputs the information to the biological particle sorting device. Then, the biological particle sorting device may adjust the drive waveform of the pressure changing element on the basis of the information.

Alternatively, there is a case where information associated with the percentage or the number of the sorting target particles contained in the unit sample may be acquired by executing a sorting operation on a certain sample by the biological particle sorting device according to the present disclosure. In such a case, the biological particle sorting device may adjust the drive waveform of the pressure changing element on the basis of the acquired information.

An example of drive waveform adjustment will be described below.

In a case where the percentage or the number of the sorting target particles contained in the unit sample is equal to or more than a predetermined value (or more than the predetermined value), the biological particle sorting device (especially, the control unit) increases the drive time, lowers the drive voltage, or executes both of them.

On the other hand, in a case where the percentage or the number of the sorting target particles contained in the unit sample is less than the predetermined value (or equal to or less than the predetermined value), the biological particle sorting device (especially the control unit) shortens the drive time, increases the drive voltage, or executes both of them.

Such adjustment is preferable for achieving both suppression of the occurrence of cavitation and maximization of the sorting efficiency. That is, the control unit may adjust the drive waveform so as to suppress the occurrence of cavitation in the channel on the basis of the information associated with the percentage or the number of the sorting target particles contained in the unit sample.

Note that the predetermined value referred to for executing the drive waveform adjustment is also referred to as a "threshold value" in the present specification.

The percentage or the number of the sorting target particles contained in the unit sample may be a percentage or a number acquired by the biological particle sorting device as described above, or may be an estimated percentage or number.

The estimated percentage or number may be obtained by a calculation based on a percentage or the number of sorting target particles contained in a certain amount of sample and a relationship between the certain amount and the amount of a unit sample.

In the drive waveform adjustment, the control unit may select, for example, any of two drive waveforms in accordance with the percentage or the number of the sorting target particles contained in the unit sample. The two drive waveforms may differ in the drive time, and may be a first drive waveform having a longer drive time and a second drive waveform having a shorter drive time.

The control unit may adopt the first drive waveform in a case where the percentage or the number is equal to or more than a predetermined value (or more than the predetermined value), and may adopt the second drive waveform in a case where the percentage or the number is less than the predetermined value (or equal to or less than the predetermined value).

The first drive waveform may be, for example, a drive waveform having a drive time of 50 μs or more, 55 μs or more, 57 μs or more, or 60 μs or more.

The drive time of the second drive waveform may be shorter than that of the first drive waveform. For example, the drive time of the second drive waveform may be shorter than the drive time of the first drive waveform by 5 μs or more, 10 μs or more, or 15 μs or more. In a case where the drive time of the first drive waveform is 60 μs, the drive time of the second drive waveform may be, for example, 55 μs or less, 50 μs or less, or 45 μs or less.

In the drive waveform adjustment according to the present disclosure, for example, the step-down time, the step-up time, or both of them may be changed. For example, in a case where the percentage or the number is equal to or more than the predetermined value (or more than the predetermined value), the control unit increases the step-down time, the step-up time, or both of them. On the other hand, in a case where the percentage or the number is less than the predetermined value (or equal to or less than the predetermined value), the control unit shortens the step-down time, the step-up time, or both of them. To change the step-down time and/or the step-up time is especially effective for suppressing the occurrence of cavitation.

The first drive waveform may be, for example, a drive waveform in which a step-down time and/or a step-up time is 20 μs or more, 25 μs or more, 27 μs or more, or 30 μs or more.

A step-down time and/or a step-up time of the second drive waveform may be shorter than those of the first drive waveform. For example, the step-down time and/or the step-up time of the second drive waveform may be shorter by 5 μs or more, 10 μs or more, or 15 μs or more than the step-down time and/or the step-up time of the first drive waveform. In a case where the step-down time and/or the step-up time of the first drive waveform is 30 μs, the step-down time and/or the step-up time of the second drive waveform may be, for example, 25 μs or less, 20 μs or less, or 15 μs or less.

The first drive waveform and the second drive waveform may have holding times different from each other, or may have the same holding time. Furthermore, the first drive waveform and/or the second drive waveform does not necessarily have a holding time. The holding time in these drive waveforms may be, for example, 0 μs or more, 3 μs or more, or 5 μs or more. The holding time in these drive waveforms may be 20 μs or less, 15 μs or less, or 10 μs or less.

The predetermined value may be appropriately selected in accordance with a sorting condition (for example, a sample to be subjected to the sorting processing by the biological particle sorting device, a microchip, or the like). The predetermined value may be, for example, 500 times or more, 1000 times or more, 2000 times or more, or 3000 times or more. Furthermore, the predetermined value may be, for example, 20,000 times or less, 15000 times or less, 10,000 times or less, or 5000 times or less.

The drive voltage of the first drive waveform may be, for example, 1 V or more, 5 V or more, or 10 V or more. The drive voltage of the first drive waveform may be, for example, 1000 V or less, 500 V or less, or 300 V or less.

A numerical range described for the drive voltage of the first drive waveform is also applied to the drive voltage of the second drive waveform.

The drive voltage of the first drive waveform and the drive voltage of the second drive waveform may be the same, or may be different.

In the drive waveform adjustment, the control unit may select, for example, any of three or more drive waveforms in accordance with the percentage or the number. The three or more drive waveforms may differ in the drive time, and include a first drive waveform having the longest drive time, a second drive waveform having the shortest drive time, and one or more other drive waveforms having a drive time between the two drive times.

The control unit may adopt the first drive waveform in a case where the percentage or the number is equal to or more than a first predetermined value (or more than the first predetermined value), and adopt the second drive waveform in a case where the percentage or the number is less than a second predetermined value (or less than the second predetermined value). Furthermore, in a case where the percentage or the number is between the first predetermined value and the second predetermined value, the control unit may adopt any of the one or more other drive waveforms.

The first predetermined value and the second predetermined value may be appropriately selected in accordance with a sorting condition (for example, a sample to be subjected to the sorting processing by the biological particle sorting device, a microchip, or the like). These values may be, for example, 500 times or more, 1000 times or more, 2000 times or more, or 3000 times or more.

Furthermore, these predetermined values may be, for example, 20,000 times or less, 15000 times or less, 10,000 times or less, or 5000 times or less.

(3-4) Timing of Drive Waveform Adjustment

Figure 12:
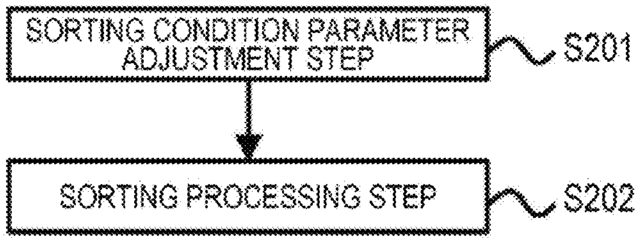
FIG. 12 is a view illustrating an example of an operation flow in the biological particle sorting device of the present disclosure.

In order to perform an appropriate sorting operation by the biological particle sorting device according to the present disclosure, the biological particle sorting device may be configured to execute a parameter adjustment step S201 of adjusting a sorting condition parameter before performing a biological sample sorting processing step, and then, execute a sorting processing step S202 of sorting a sorting target particle contained in a biological sample using the sorting condition parameter set in the adjustment step as illustrated in FIG. 12. In the present disclosure, the control unit may execute the drive waveform adjustment described above in the parameter adjustment step or in the biological sample sorting processing step. Examples of the sorting condition parameter include a delay time and a guard time in addition to a drive waveform.

(3-4-1) Drive Waveform Adjustment in Sorting Condition Parameter Adjustment Step In one embodiment of the present disclosure, the control unit executes drive waveform adjustment in the parameter adjustment step. The drive waveform adjustment in the parameter adjustment step will be described below.

Figure 13:
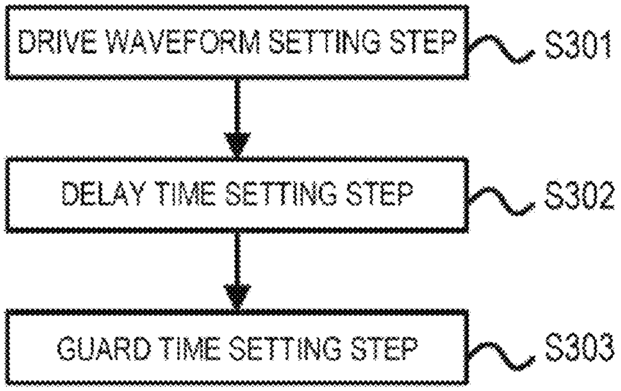
FIG. 13 is a view illustrating an example of a flow of a parameter adjustment step.

First, the parameter adjustment step S201 will be described below with reference to FIG. 13. As illustrated in the drawing, the parameter adjustment step S201 may include a drive waveform setting step S301, a delay time setting step S302, and a guard time setting step S303.

In the drive waveform setting step S301, the biological particle sorting device according to the present disclosure executes sorting processing on a part of the biological sample to be subjected to the sorting processing step. Through the sorting processing, the control unit acquires information associated with the number of times of sorting processing per unit time or information associated with a percentage or the number of sorting target particles contained in a unit sample. Then, the control unit adjusts a drive waveform on the basis of these pieces of information. The drive waveform adjustment may be executed as described in (3-1) to (3-3) above.

In a particularly preferable embodiment, in the drive waveform setting step S301, the control unit adjusts a drive time on the basis of the information associated with the number of times of sorting processing per unit time or the information associated with the percentage or the number of the sorting target particles contained in the unit sample, and a drive voltage set to be applied to the sorting processing. The drive voltage set to be applied to the sorting processing may be set in advance in the biological particle sorting device before executing the drive waveform setting step S301, or may be set in advance by a user of the biological particle sorting device. Such a process of adjusting the drive time is preferably performed in the parameter adjustment step, especially in the drive waveform setting step. Therefore, parameter optimization in the delay time setting step and/or the guard time setting process, which will be described later, can be executed more accurately.

Figure 14:
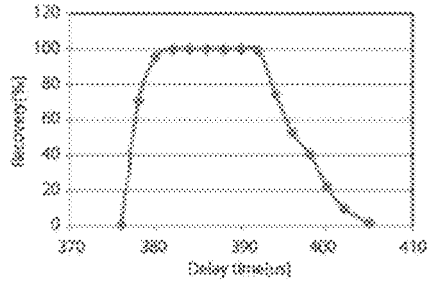
FIG. 14 is a view illustrating an example of a relationship between the delay time and a collection rate.

In the delay time setting step S302, a delay time is set using the drive waveform set in the drive waveform setting step S301. For example, the biological particle sorting device executes sorting processing on a part of the biological sample to be subjected to the sorting processing step. The control unit acquires a relationship between a delay time and a collection rate in the sorting processing. For example, the relationship between the delay time and the collection rate (Recovery) as illustrated in FIG. 14 is obtained. The control unit selects a delay time for achieving a predetermined collection rate on the basis of the relationship. For example, the control unit selects any of delay times with which the collection rate is maximized as a parameter to be used in the next sorting processing step.

When the delay time setting step S302 is executed, the drive waveform setting step S301 may be executed. For example, the control unit acquires the information used for drive waveform adjustment through the execution of the sorting processing that has been executed to acquire the relationship between the delay time and the collection rate. Then, the control unit may execute the drive waveform adjustment as described above on the basis of the acquired information.

Furthermore, the drive waveform setting step S301 may be executed after the delay time setting step S302 has been executed.

An example of processing executed in the delay time setting step S302 will be described below with reference to FIG. 18.

Figure 18:
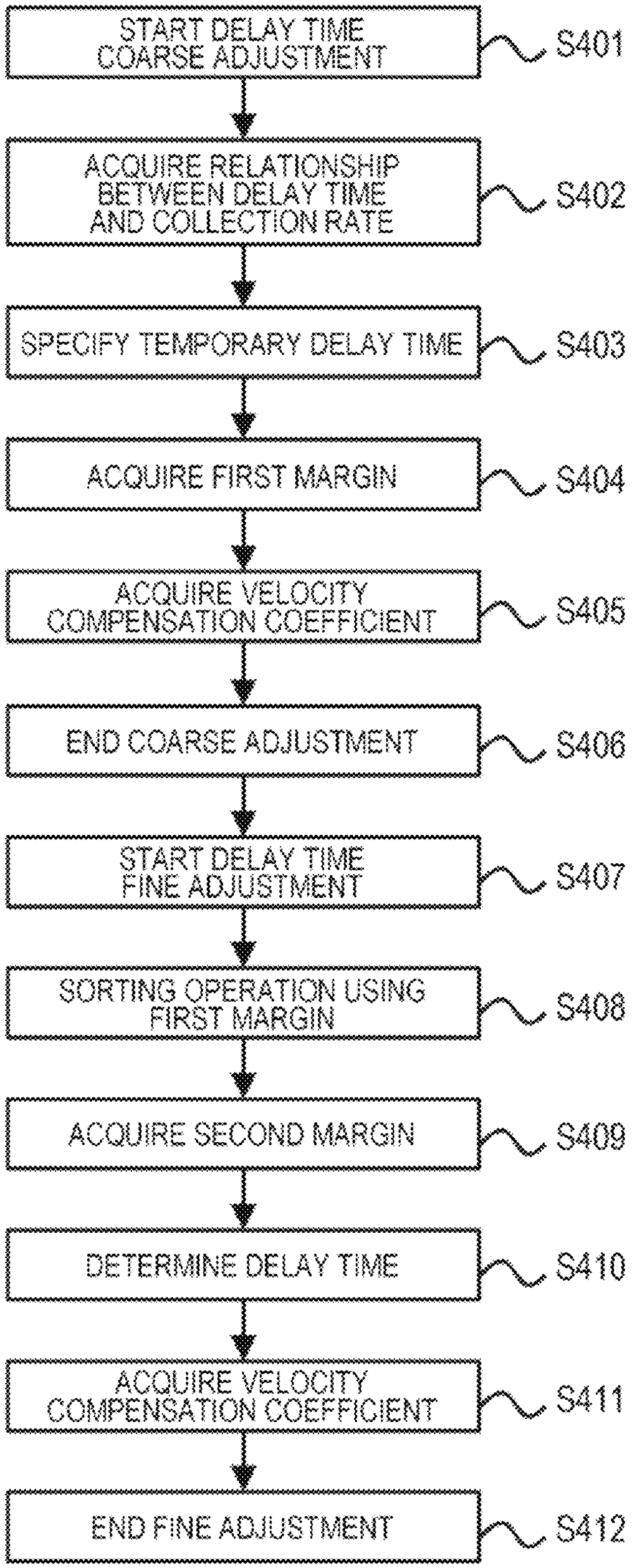
FIG. 18 is an example of a flowchart of a delay time setting step.

As illustrated in FIG. 18, the delay time setting step may include a coarse adjustment process (steps S401 to S406) and a fine adjustment process (steps S407 to S412).

In step S401, the control unit starts the coarse adjustment process of a delay time.

In step S402, the control unit acquires data on a relationship between a delay time and a collection rate. The relationship may be the relationship described above with reference to FIG. 14. More specifically, the data may include a plurality of sets of "a certain delay time" and "a collection rate in a case where the certain delay time is adopted". The control unit may acquire and hold the data in a table format, or may acquire and hold the data in a plot format as illustrated in FIG. 14.

In step S403, the control unit specifies a temporary delay time. The temporary delay time may be, for example, a value selected from a range of delay times in which collection rates are equal to or more than a first predetermined value (for example, a median value or a weighted average value of the delay times in the range, or a delay time in a case where the maximum collection rate is obtained). For example, the control unit specifies a range of delay times in which collection rates are 75% or more, and specifies a median value of the range as the temporary delay time.

In step S404, the control unit acquires a first margin. The first margin may be a range of delay times in which collection rates are equal to or more than a second predetermined value. Preferably, the second predetermined value is a value larger than the first predetermined value referred to in step S403. For example, the control unit specifies a range of delay times in which collection rates are 85% or more as the first margin.

In step S405, the control unit calculates a temporary velocity compensation coefficient for automatically correcting a variation in a velocity at which a particle flows on the basis of the temporary delay time. There is a case where the velocity of the particle flowing in the channel is different for each particle. Therefore, the control unit performs a process of automatically compensating a particle velocity using the velocity compensation coefficient in accordance with the particle velocity.

In step S406, the control unit ends the delay time coarse adjustment process.

In step S407, the control unit starts the fine adjustment process of a delay time.

In step S408, the control unit adjusts a drive waveform to be applied in a sorting operation on the basis of the first margin. Especially, the control unit adjusts a drive voltage and/or a holding time among components of the drive waveform. Then, the biological particle sorting device executes the sorting operation using the temporary delay time and the drive waveform. In the sorting operation, for example, the control unit determines to sort a biological particle in a case where the biological particle is present within a range of the first margin, and determines not to sort a biological particle in a case where the biological particle is present outside the range of the first margin.

In step S409, the control unit acquires a second margin. The second margin may be a range of delay times in which collection rates are equal to or more than a third predetermined value. The third predetermined value may be the same as the second predetermined value, or may be higher or lower than the second predetermined value. For example, the control unit specifies, as the second margin, a range of delay times in which collection rates are successively 85% or more.

In step S410, the control unit specifies a best delay time within the second margin. The best delay time may be, for example, a value selected within the second margin. The value may be, for example, a weighted average value or a median value of delay times within the second margin, or may be a delay time in a case where the maximum collection rate is obtained within the second margin. For example, the control unit specifies a weighted average value of delay times with which collection rates are 85% or more as the best delay time. The best delay time is used in the sorting processing step S202.

In step S411, the control unit calculates a velocity compensation coefficient for automatically correcting a variation in a velocity at which a particle flows again on the basis of the delay time. The control unit performs a process of automatically compensating a particle velocity using the velocity compensation coefficient in accordance with the particle velocity.

In step S412, the control unit ends the fine adjustment process.

In the guard time setting step S303, the control unit sets a guard time in one driving of the pressure changing element. The guard time will be described below.

A fluid (especially, a liquid) present in a predetermined region and containing a sorting target particle is recovered into the biological particle recovery channel 159 by one driving of the pressure changing element. For example, a case where the region R1 illustrated in the upper part of FIG. 11 is recovered is assumed. In this case, in a case where another particle (indicated in black) flowing before or after a sorting target particle (indicated in white) is present in the same region, the another particle is also recovered in the biological particle recovery channel 159, which may cause a decrease in a purity of the sorting target particle. Whether or not another particle is present in the same region can be determined on the basis of time when light generated by irradiating a sorting target particle with light is detected and time when light generated by irradiating the another particle flowing before or after the particle with light is detected. For example, on the basis of a difference between the former time and the latter time, the control unit can determine whether or not another particle is present within the predetermined range. More specifically, the control unit may determine whether or not another particle is present in the predetermined region on the basis of whether or not the difference is equal to or less than a predetermined value. The predetermined value corresponds to the guard time.

A value, such as the predetermined value, used to determine whether or not a particle other than a sorting target particle is present in a predetermined region recovered in the biological particle recovery channel 159 by one driving of the pressure changing element is referred to as the guard time in the present specification.

In the guard time setting step S303, for example, the biological particle sorting device executes sorting processing on a part of the biological sample to be subjected to the sorting processing step using a preset initial guard time. The control unit acquires a collection rate of the sorting target particle from a result of execution of the sorting processing. The collection rate may be a collection rate represented by the number of sorted particles with respect to the number of sorting operations.

The control unit determines whether or not to adjust the initial guard time on the basis of whether or not the acquired collection rate satisfies a predetermined condition. In a case where the predetermined condition is satisfied (for example, in a case of being equal to or more than a predetermined numerical value), the control unit sets the initial guard time as the guard time to be used in the sorting processing step S202. In a case where the predetermined condition is not satisfied (for example, in a case of being less than the predetermined numerical value), the control unit determines to adjust the initial guard time.

In a case where the initial guard time is to be adjusted, the control unit acquires a collection rate in a case of using a changed guard time obtained by adding a predetermined value to the initial guard time. The control unit executes similar determination as described above regarding the collection rate, and sets the changed guard time as the guard time to be used in the sorting processing step S202 in a case where the predetermined condition is satisfied.

The biological particle sorting device according to the present disclosure executes the delay time setting step and/or the guard time setting step after executing the drive waveform setting step. Therefore, the delay time and/or the guard time can be set in a state in which an effect of the occurrence of cavitation is removed or reduced. Therefore, a better parameter can be adopted for the subsequent sorting processing step.

(3-4-2) Drive Waveform Adjustment in Sorting Processing Step

The biological particle sorting device according to the present disclosure executes the sorting processing step S202 using the sorting condition parameter set in the parameter adjustment step. The biological particle sorting device according to the present disclosure may execute the drive waveform adjustment described above in the sorting processing step. For example, when the drive waveform is adjusted in the course of executing sorting processing, an appropriate sorting operation according to the state of the sample can be executed, which leads to speed-up of the sorting processing, for example.

(3-5) Delay Time Setting Process

As described in (3-4) above, the parameter adjustment step may include a delay time setting step in the biological particle sorting device according to the present disclosure. The biological particle sorting device may be configured to execute a delay time adjustment process in the delay time setting step. The biological particle sorting device may be configured to measure a collection rate represented by the number of sorted particles with respect to the number of sorting operations in the delay time adjustment process. A delay time can be optimized by measuring the collection rate.

The delay time adjustment process may include measuring collection rates in a case where a shifted delay time as well as an initial delay time is adopted. The initial delay time may be set in advance in the device, or may be set by a user. A time obtained by adding or subtracting a predetermined time $\Delta T$ to or from the initial delay time is the shifted delay time. In a preferred embodiment, the biological particle sorting device of the present disclosure measures not only the collection rate measured in a case where the initial delay time is adopted but also the collection rate measured in a case where at least one shifted delay time (especially, a plurality of delay times) is adopted. Then, the biological particle sorting device (especially, the control unit) may select a delay time to be adopted in the sorting processing step on the basis of these plurality of collection rates. Therefore, a better delay time can be selected.

In a particularly preferred embodiment, only in a case where no other biological particle is present within a predetermined range around a biological particle determined to be sorted, the biological particle sorting device is configured to execute a sorting operation for the biological particle in measuring the collection rate. In the collection rate measurement executed to set the delay time, it is not desirable to sort a particle other than the particle determined to be sorted. Therefore, since the collection rate is measured by executing the sorting operation only in the above case, the delay time setting accuracy can be enhanced.

Figure 15:
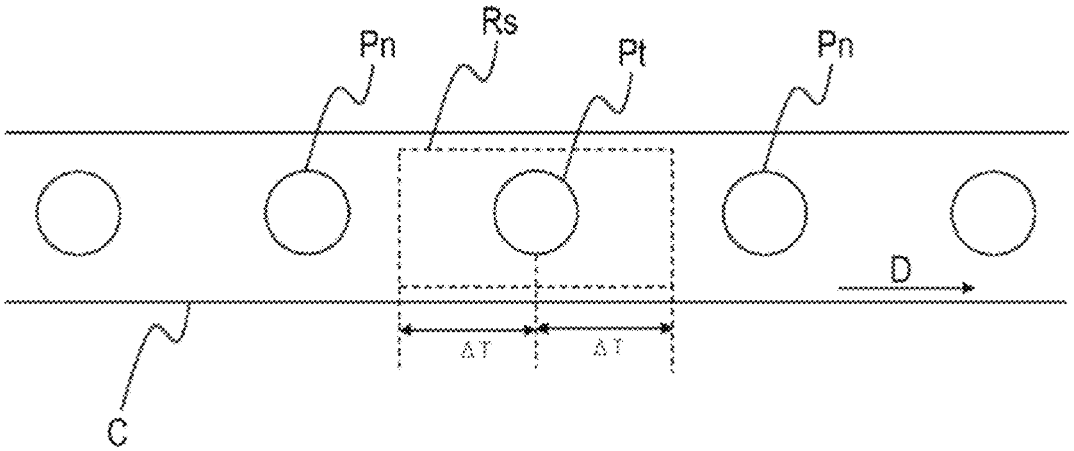
FIG. 15 is a schematic view illustrating a state in which biological particles are aligned in a line and flow in a traveling direction D in the channel.

As described above, the predetermined range may be a range recovered into the particle sorting channel in a case where the delay time is shifted. This will be described with reference to FIG. 15. The drawing is a schematic view illustrating a state in which biological particles P are aligned in a line and flow in a traveling direction D in a channel C.

A case where a particle Pt is determined to be sorted in measuring the collection rate is assumed. In this case, a collection rate in a case where an initial delay time is adopted and a collection rate a delay time shifted by $\Delta T$ as illustrated in the drawing are measured. A region recovered into the biological particle recovery channel 159 in a case where the shifted delay time is adopted is a region Rs.

In a preferred embodiment of the present disclosure, the biological particle sorting device executes a sorting operation for the particle Pt only in a case where no other biological particle is present in the region Rs in measuring the collection rate. Therefore, the relationship between the delay time and the collection rate can be grasped more accurately, and the delay time setting accuracy can be improved.

(3-6) Real-Time Drive Waveform Adjustment

The drive waveform adjustment according to the present disclosure may be executed in the sorting processing step as described above in (3-4-2). The control unit may execute the drive waveform adjustment for each predetermined portion of the sample, or for each particle contained in the sample. Therefore, the drive waveform can be adjusted in real time. In order to execute the drive waveform adjustment in this manner, the control unit may have a parameter such as an optimal delay time in advance for each drive waveform to be adopted. Therefore, more efficient drive waveform adjustment is possible.

(3-7) Drive Waveform Adjustment for Sorting Multiple Types of Sorting Target Particles One sample may contain a plurality of types of sorting target particles. In this case, a sorting operation of sorting the plurality of types of sorting target particles may be executed in one sorting operation. The drive waveform adjustment according to the present disclosure may be executed in a case where a sorting operation for sorting a plurality of types of sorting target particles is executed, and especially may be executed in a case where one sorting operation for sorting a plurality of types of sorting target particles at a predetermined ratio is executed.

In these cases, the control unit may adjust the drive waveform of the pressure changing element on the basis of information associated with the number of times of sorting processing per unit time. Regarding the information, the number of times of sorting processing may be a sum of the number of times of sorting processing of the plurality of types of sorting target particles. The sum may mean a sum of the number of times of sorting processing of each sorting target particle.

Furthermore, regarding the information, the number of times of sorting processing may be the number of times of sorting processing of any one or two or more sorting target particles among the plurality of types of sorting target particles. In this case, for example, the drive waveform may be adjusted on the basis of the number of times of sorting processing of the any one or two or more sorting target particles and a constituent percentage of the any one or two or more sorting target particles. For example, information corresponding to the sum is obtained from the number of times of sorting processing and the constituent percentage. Note that a denominator of the constituent percentage may be the number of the plurality of types of sorting target particles, that is, the constituent percentage may mean a percentage of the number of the any one or two or more sorting target particles to the plurality of types of sorting target particles.

In a case where the biological particle sorting device executes one sorting operation of sorting a plurality of types of sorting target particles at a predetermined ratio, the control unit may adjust the drive waveform before executing the sorting operation or in the middle of the sorting operation. In the latter case, the control unit may adjust the drive waveform in response to a change of a sorting target particle in the middle of the sorting operation. For example, the control unit may execute the drive waveform adjustment in the parameter adjustment step S201 described above, or may execute the drive waveform adjustment in the sorting processing step S202.

Figure 16:
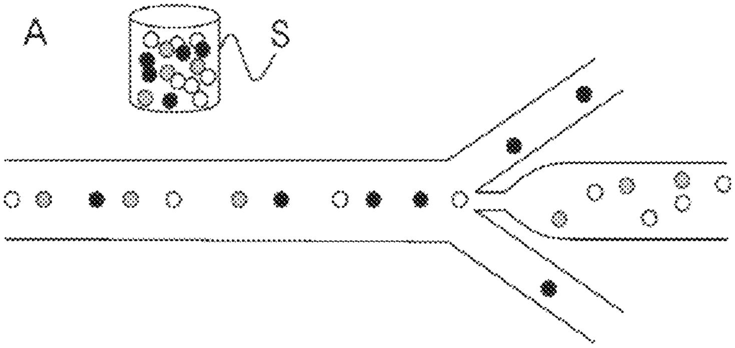
FIG. 16 is a schematic view illustrating a state in which a plurality of types of sorting target particles is sorted.
Figure 16:
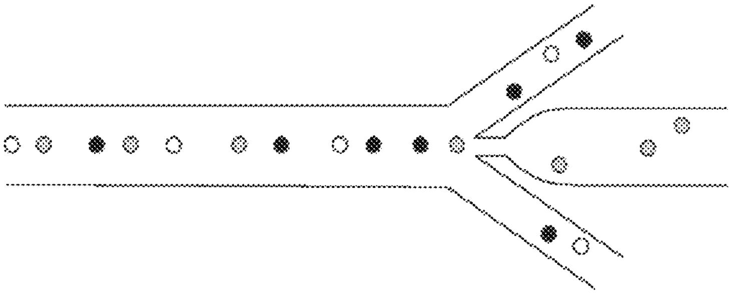

Furthermore, in the sorting operation, both a first sorting target particle and a second sorting target particle are initially set as sorting targets, but after a predetermined number of one of these two types of particles is recovered, control may be performed such that only the other particle is set as the sorting target without setting the one particle as the sorting target. This sorting operation will be described below with reference to FIG. 16.

For example, a case in which a sorting operation of sorting a first sorting target particle and a second sorting target particle at a predetermined ratio is executed from a biological sample S containing the first sorting target particle (white), the second sorting target particle (gray), and the other particles (black) is assumed as illustrated in FIG. 16A.

In this sorting operation, first, the first sorting target particle and the second sorting target particle are sorted into the biological particle recovery channel 159, and the other particles travel to branching channels as illustrated in FIG. 16A.

When a predetermined number of the first sorting target particles is recovered, sorting of the first sorting target particle becomes unnecessary in order to achieve the predetermined ratio. Therefore, in response to the recovery of the predetermined number of first sorting target particles, the control unit changes a sorting target to only the second sorting target particle.

After the change, only the second sorting target particle is sorted into the particle sorting channel, and the first sorting target particle and the other particles travel to the branching channels as illustrated in FIG. 16B.

The number of times of sorting processing per unit time is different before and after the change. Furthermore, a percentage or the number of sorting target particles contained in a unit sample is also different before and after the change.

More specifically, for example, in order to sort the first sorting target particle and the second sorting target particle at a ratio of 1:1, the biological particle sorting device executes the sorting operation so as to sort 100 particles of each of these two types of particles. In the sorting operation, there is a case where the number of sorted second sorting target particles does not reach 100 when 100 first sorting target particles have been sorted. In this case, it is unnecessary to sort the first sorting target particle, and it is necessary to sort only the second sorting target particle. Therefore, the sorting target is changed from both the first sorting target particle and the second sorting target particle to only the second sorting target particle.

In such a sorting operation, the number of times of driving per unit time or the percentage or the number of sorting target particles per unit amount is changed in the middle of the sorting operation. Therefore, the biological particle sorting device of the present disclosure (especially, the control unit) may adjust the drive waveform in the middle of the sorting operation. For example, the control unit may adjust the drive waveform in response to a change in information associated with the number of times of sorting processing per unit time or information associated with the percentage or the number of sorting target particles contained in the unit sample in the middle of the sorting operation.

For example, the control unit may shorten the drive time in response to a decrease in the number of times of sorting processing or the percentage or the number due to the change.

As described above, in an embodiment of the present disclosure, in a case where the biological particle sorting device executes one sorting operation of sorting a plurality of types of sorting target particles at a predetermined ratio, the control unit adjusts the drive waveform in the middle of the sorting operation. In this embodiment, the control unit may adjust the drive waveform in response to a change of a sorting target particle in the middle of the sorting operation.

Furthermore, in a case where one sample contains a plurality of types of sorting target particles, after a first sorting operation of sorting one type of sorting target particle is executed, the sample from which the sorting target particle has been removed is subjected to a second sorting operation of sorting another type of sorting target particle.

Figure 17:
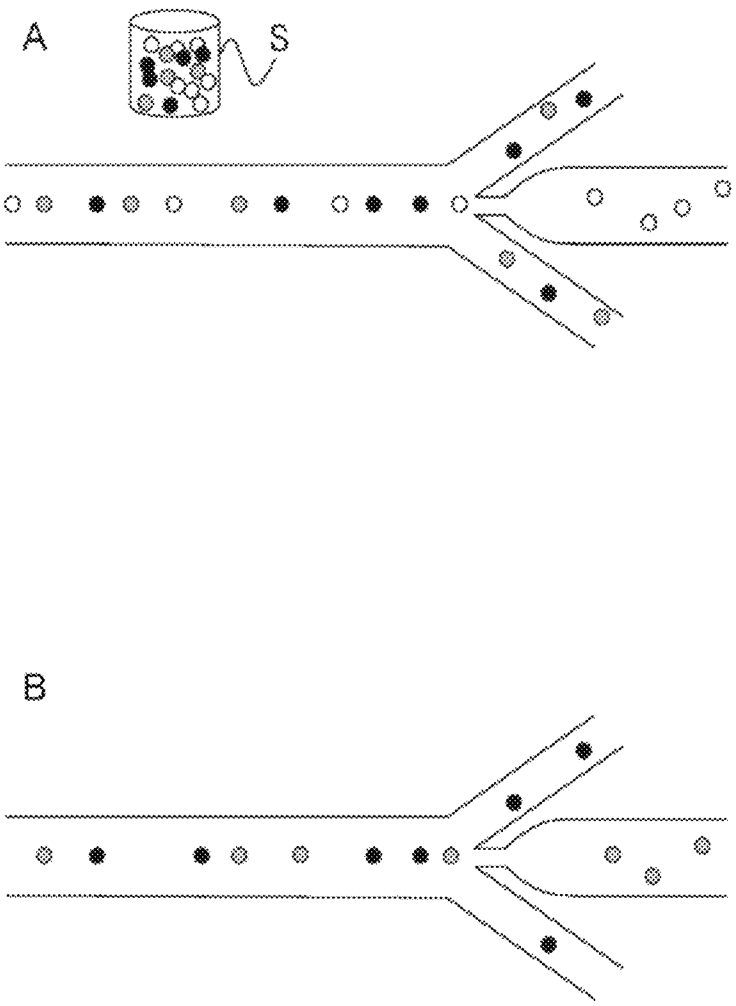
FIG. 17 is a schematic view illustrating a state in which a plurality of types of sorting target particles is sorted.

For example, a case in which a sorting operation is executed on the biological sample S containing a first sorting target particle (white), a second sorting target particle (gray), and the other particles (black) is assumed as illustrated in FIG. 17A.

In this case, in a first sorting operation, as illustrated in FIG. 17A, only the first sorting target particle is sorted into the biological particle recovery channel 159, and the second sorting target particle and the other particles travel to branching channels.

Next, in a second sorting operation, as illustrated in FIG. 17B, the second sorting target particle is sorted into the biological particle recovery channel 159, and the other particles travel to the branching channels.

The number of times of sorting processing per unit time is different between the first sorting operation and the second sorting operation. Furthermore, a percentage or the number of sorting target particles contained in a unit sample is also different between the samples subjected to the first sorting operation and the second sorting operation.

In a case where the sorting operation is performed a plurality of times as described above, the drive waveform adjustment process according to the present disclosure may be executed for each of the sorting operations. That is, the biological particle sorting device of the present disclosure may be configured to execute drive waveform adjustment for execution of each of the sorting operations before execution of each of the sorting operations in a case where the sorting operation is executed a plurality of times. The drive waveform adjustment may be executed by the control unit as described above.

As described above, in another embodiment of the present disclosure, in a case where the biological particle sorting device executes a plurality of sorting operations to sort a plurality of types of sorting target particles at a predetermined ratio, the control unit adjusts the drive waveform before executing each of the sorting operations. In this embodiment, the control unit may adjust the drive waveform in response to a change of a sorting target particle in the middle of the sorting operation.

(3-8) Drive Waveform Adjustment According to Device or Environment

The control unit may execute the drive waveform adjustment in response to replacement of the microchip, in response to a change in a sample, in response to a change in an environment in which a sorting operation is executed, in response to a change in an execution condition of the sorting operation, or for each sorting operation. Therefore, an optimal drive waveform can be selected for each sorting operation.

The control unit may change the threshold value in response to replacement of the microchip, in response to a change in a sample, in response to a change in an environment in which a sorting operation is executed, in response to a change in an execution condition of the sorting operation, or for each sorting operation. Therefore, it is possible to execute appropriate drive waveform adjustment in accordance with various environments.

(3-9) Drive Waveform Adjustment According to Purity

A purity of a sorting target particle contained in particles to be recovered into the biological particle recovery channel 159 may be appropriately changed, for example, in accordance with needs of a user. A sorting condition parameter may be changed in accordance with the purity. Therefore, the control unit may adjust the drive waveform in accordance with the purity of the sorting target particle.

(3-10) Drive Waveform Adjustment Based on Information Associated with Occurrence of Cavitation In still another embodiment of the present disclosure, the control unit may adjust the drive waveform based on information associated with the occurrence of cavitation (hereinafter, also referred to as "cavitation information"). The cavitation information may be acquired, for example, by imaging of a place where cavitation is likely to occur, such as the biological particle recovery channel 159. Alternatively, the cavitation information may be acquired by light irradiation with respect to the place. For example, the light irradiation is performed on bubbles generated by cavitation, and the generation of bubbles may be detected on the basis of light generated by the light irradiation.

For the imaging to acquire the cavitation information, the biological particle sorting device of the present disclosure may include, for example, an imaging device configured to image the location. Furthermore, for the light irradiation and the detection, the biological particle sorting device of the present disclosure may include, for example, a light irradiation unit that irradiates the place with light and a detection unit that detects light generated by the light irradiation. Since the description regarding the light irradiation unit 101 and the detection unit 102 described in (2) above is applied to the light irradiation unit and the detection unit, the description thereof will be omitted.

2. Second Embodiment (Method for Adjusting Sorting Condition in Biological Particle Sorting Device)

The present disclosure also provides a method for adjusting a sorting condition in a biological particle sorting device. The method includes a drive waveform adjustment step of adjusting a drive waveform of a pressure changing element that changes a pressure in a channel in which a biological particle determined to be sorted is recovered. In the drive waveform adjustment step, the drive waveform of the pressure changing element is adjusted on the basis of information associated with the number of times of sorting processing per unit time or information associated with a percentage or the number of sorting target particles contained in a unit sample. The occurrence of cavitation can be prevented by such an adjustment method. Moreover, it is also possible to maximize the sorting efficiency while preventing the occurrence of cavitation.

The biological particle sorting device may be, for example, the biological particle sorting device described in the above section 1. and the description thereof is also applied to this embodiment.

The method for adjusting a sorting condition may correspond to, for example, the parameter adjustment step S201 described in the above section 1. The drive waveform setting step S301 executed in the parameter adjustment step S201 corresponds to the drive waveform adjustment step.

Furthermore, the present disclosure also provides a program for causing a computer to execute the drive waveform adjustment step. The computer corresponds to the biological particle sorting device described in the above section 1, and especially corresponds to the control unit included in the device. Furthermore, the present disclosure also provides a biological particle sorting method including executing the drive waveform adjustment step described in the above section 1.

Note that, the present disclosure can also have the following configurations.

[1]

A biological particle sorting device including:

a pressure changing element that changes a pressure in a channel in which a biological particle determined to be sorted is recovered; and a control unit that drives the pressure changing element, in which the control unit adjusts a drive waveform of the pressure changing element on the basis of information associated with the number of times of sorting processing per unit time or information associated with a percentage or the number of sorting target particles contained in a unit sample.

[2]

The biological particle sorting device according to [1], in which the control unit adjusts a drive time, a drive voltage, or both the drive time and the drive voltage among elements of the drive waveform.

[3]

The biological particle sorting device according to [2], in which, in a case where the number of times of sorting processing is equal to or more than a predetermined value, either extension of the drive time or lower of the drive voltage is executed, or both the extension of the drive time and the lowering of the drive voltage are executed.

[4]

The biological particle sorting device according to any one of [1] to [3], in which the number of times of sorting processing is a counted number of times of sorting processing or an estimated number of times of sorting processing.

[5]

The biological particle sorting device according to any one of [1] to [3], in which the number of times of sorting processing is the number of times the pressure changing element is driven per unit time.

[6]

The biological particle sorting device according to any one of [1] to [3], in which the number of times of sorting processing is the number of times a determination is made to execute sorting per unit time.

[7]

The biological particle sorting device according to [6], further including a determination unit that determines whether or not to sort a biological particle, in which the control unit adjusts the drive waveform on the basis of information associated with the number of times a determination is made to execute sorting by the determination unit.

[8]

The biological particle sorting device according to [2], in which, in a case where the percentage or the number of the sorting target particles is equal to or more than a predetermined value, the control unit increases the drive time, lowers the drive voltage, or executes both the increase of the drive time and the lowering of the drive voltage.

[9]

The biological particle sorting device according to [8], in which the information associated with the percentage or the number of the sorting target particles is information acquired as a result of a sorting operation executed by the biological particle sorting device or information input to the biological particle sorting device.

[10]

The biological particle sorting device according to any one of [1] to [9], in which the control unit adjusts one or more of a step-up time, a step-down time, and a holding time among elements of the drive waveform.

[11]

The biological particle sorting device according to any one of [1] to [10], in which, in adjusting the drive waveform, the control unit selects a drive waveform to be applied from among a plurality of types of drive waveforms set in advance on the basis of either the information associated with the number of times of sorting processing or the information associated with the percentage or the number of sorting target particles.

[12]

The biological particle sorting device according to any one of [1] to [11], in which the control unit adjusts the drive waveform in a sorting condition parameter adjustment step before performing a biological sample sorting processing step or in the biological sample sorting processing step.

[13]

The biological particle sorting device according to any one of [1] to [12], in which the control unit adjusts a drive time on the basis of the information associated with the number of times of sorting processing per unit time or the information associated with the percentage or the number of the sorting target particles contained in the unit sample, and a drive voltage set to be applied to the sorting processing.

[14]

The biological particle sorting device according to [13], in which the control unit is configured to adjust the drive waveform in a sorting condition parameter adjustment step before performing a biological sample sorting processing step, and the control unit adjusts the drive time in the sorting condition parameter adjustment step.

[15]

The biological particle sorting device according to any one of [1] to [14], in which in a case where the biological particle sorting device executes one sorting operation of sorting a plurality of types of sorting target particles at a predetermined ratio, the control unit adjusts a drive waveform of the pressure changing element on the basis of the information associated with the number of times of sorting processing per unit time.

[16]

The biological particle sorting device according to any one of [1] to [15], in which the control unit adjusts the drive waveform in response to a change of a sorting target particle in the middle of the sorting operation.

[17]

The biological particle sorting device according to any one of [1] to [16], the biological particle sorting device being configured to execute a parameter adjustment step of adjusting a sorting condition parameter to be used in a biological sample sorting processing step.

[18]

The biological particle sorting device according to [17], the biological particle sorting device being configured to execute a delay time adjustment process in the parameter adjustment step.

[19]

The biological particle sorting device according to [18], the biological particle sorting device being configured to measure a collection rate represented by the number of sorted particles with respect to the number of sorting operations in the delay time adjustment process.

[20]

The biological particle sorting device according to [19], in which, in measuring the collection rate, only in a case where no other biological particle is present within a predetermined range around a biological particle determined to be sorted, a sorting operation is executed for the biological particle.

[21]

A method for adjusting a sorting condition in a biological particle sorting device, the method including a drive waveform adjustment step of adjusting a drive waveform of a pressure changing element that changes a pressure in a channel in which a biological particle determined to be sorted is recovered, in which, in the drive waveform adjustment step, the drive waveform of the pressure changing element is adjusted on the basis of information associated with the number of times of sorting processing per unit time or information associated with a percentage or the number of sorting target particles contained in a unit sample.

REFERENCE SIGNS LIST

100 Biological particle sorting device
101 Light irradiation unit
102 Detection unit
103 Control unit
105 Determination unit
107 Pressure changing element
150 Biological particle sorting microchip

The invention claimed is:

1. A biological particle sorting device comprising:

a pressure changing element configured to change a pressure in a channel in which a biological particle determined to be sorted is recovered; and a control unit programmed to drive the pressure changing element, wherein the control unit is configured to adjust a drive waveform of the pressure changing element on a basis of information associated with a number of times of sorting processing per unit time.

2. The biological particle sorting device according to claim 1, wherein the control unit is configured to adjust a drive time, a drive voltage, or both the drive time and the drive voltage among elements of the drive waveform.

3. The biological particle sorting device according to claim 2, wherein, in a case where the number of times of sorting processing is equal to or more than a predetermined value, the drive time is increased, the drive voltage is lowered, or both the increase of the drive time and the lowering of the drive voltage are executed.

4. The biological particle sorting device according to claim 1, wherein the number of times of sorting processing is a counted number of times of sorting processing or an estimated number of times of sorting processing.

5. The biological particle sorting device according to claim 1, wherein the number of times of sorting processing is a number of times the pressure changing element is driven per unit time.

6. The biological particle sorting device according to claim 1, wherein the number of times of sorting processing is a number of times a determination is made to execute sorting per unit time.

7. The biological particle sorting device according to claim 6, further comprising a determination unit configured to determine whether or not to sort a biological particle, wherein the control unit is configured to adjust the drive waveform on a basis of information associated with the number of times a determination is made to execute sorting by the determination unit.

8. The biological particle sorting device according to claim 2, wherein, the control unit is further configured to adjust the drive waveform of the pressure changing element on a basis of information associated with a percentage or a number of sorting target particles contained in a unit sample; and in a case where the percentage or the number of the sorting target particles is equal to or more than a predetermined value, the control unit is configured to increase the drive time, lower the drive voltage, or execute both the increase of the drive time and the lowering of the drive voltage.

9. The biological particle sorting device according to claim 8, wherein the information associated with the percentage or the number of the sorting target particles is information acquired as a result of a sorting operation executed by the biological particle sorting device or information input to the biological particle sorting device.

10. The biological particle sorting device according to claim 1, wherein the control unit is configured to adjust one or more of a step-up time, a step-down time, and a holding time among elements of the drive waveform.

11. The biological particle sorting device according to claim 1, wherein, in adjusting the drive waveform, the control unit selects a drive waveform to be applied from among a plurality of types of drive waveforms set in advance on a basis of either the information associated with the number of times of sorting processing or the information associated with a percentage or a number of sorting target particles.

12. The biological particle sorting device according to claim 1, wherein the control unit is configured to adjust the drive waveform in a sorting condition parameter adjustment step before performing a biological sample sorting processing step or in the biological sample sorting processing step.

13. The biological particle sorting device according to claim 1, wherein the control unit is configured to adjust a drive time on a basis of the information associated with the number of times of sorting processing per unit time or the information associated with a percentage or a number of sorting target particles contained in a unit sample, and a drive voltage set to be applied to the sorting processing.

14. The biological particle sorting device according to claim 13, wherein the control unit is configured to adjust the drive waveform in a sorting condition parameter adjustment step before performing a biological sample sorting processing step, and the control unit is configured to adjust the drive time in the sorting condition parameter adjustment step.

15. The biological particle sorting device according to claim 1, wherein in a case where the biological particle sorting device executes one sorting operation of sorting a plurality of types of sorting target particles at a predetermined ratio, the control unit is configured to adjust a drive waveform of the pressure changing element on a basis of the information associated with the number of times of sorting processing per unit time.

16. The biological particle sorting device according to claim 15, wherein the control unit is configured to adjust the drive waveform in response to a change of a sorting target particle in middle of the sorting operation.

17. The biological particle sorting device according to claim 1, the biological particle sorting device being configured to execute a parameter adjustment step of adjusting a sorting condition parameter to be used in a biological sample sorting processing step.

18. The biological particle sorting device according to claim 17, the biological particle sorting device being configured to execute a delay time adjustment process in the parameter adjustment step.

19. The biological particle sorting device according to claim 18, the biological particle sorting device being configured to measure a collection rate represented by a number of sorted particles with respect to a number of sorting operations in the delay time adjustment process.

20. The biological particle sorting device according to claim 19, wherein, in measuring the collection rate, only in a case where no other biological particle is present within a predetermined range around a biological particle determined to be sorted, a sorting operation is executed for the biological particle.

21. A method for adjusting a sorting condition in a biological particle sorting device, the method comprising a drive waveform adjustment step, wherein a control unit is configured to adjust a drive waveform of a pressure changing element that changes a pressure in a channel in which a biological particle determined to be sorted is recovered, wherein, the drive waveform adjustment step comprises: adjusting the drive waveform of the pressure changing element on a basis of information associated with a number of times of sorting processing per unit time.

* * * * *